United States Patent
Kim et al.

(10) Patent No.: US 10,103,785 B2
(45) Date of Patent: Oct. 16, 2018

(54) APPARATUS AND METHOD FOR RESONANCE POWER TRANSMISSION AND RESONANCE POWER RECEPTION

(75) Inventors: Nam Yun Kim, Seoul (KR); Sang Wook Kwon, Seongnam (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1478 days.

(21) Appl. No.: 13/154,218

(22) Filed: Jun. 6, 2011

(65) Prior Publication Data
US 2012/0049642 A1 Mar. 1, 2012

(30) Foreign Application Priority Data

Aug. 30, 2010 (KR) ........................ 10-2010-0084084

(51) Int. Cl.
| | | |
|---|---|---|
| H02J 50/50 | (2016.01) | |
| H04B 5/00 | (2006.01) | |
| H02J 7/02 | (2016.01) | |
| H02J 50/12 | (2016.01) | |
| H02J 50/80 | (2016.01) | |
| H02J 50/40 | (2016.01) | |
| H02J 5/00 | (2016.01) | |

(52) U.S. Cl.
CPC ............ *H04B 5/0075* (2013.01); *H02J 5/005* (2013.01); *H02J 7/025* (2013.01); *H02J 50/12* (2016.02); *H02J 50/40* (2016.02); *H02J 50/80* (2016.02); *H04B 5/0037* (2013.01)

(58) Field of Classification Search
CPC ........ H02J 5/005; H02J 5/0037; H02J 5/0075; H02J 50/80; H02J 50/40; H02J 50/12; H02J 7/025
See application file for complete search history.

(56) References Cited

U.S. PATENT DOCUMENTS

2005/0261037 A1* 11/2005 Raghunath ........ H04W 52/0229
455/574
2007/0008140 A1* 1/2007 Saarisalo ............. G06K 7/0008
340/572.7
(Continued)

FOREIGN PATENT DOCUMENTS

| JP | 2009-273213 | 11/2009 |
| JP | 2010-051137 | 3/2010 |
| KR | 10-2010-0094596 A | 8/2010 |

OTHER PUBLICATIONS

Korean Office Action dated Nov. 29, 2016 in counterpart Korean Patent Application No. 10-2010-0084084 (16 pages, with English translation)

*Primary Examiner* — Daniel Kessie
(74) *Attorney, Agent, or Firm* — NSIP Law

(57) ABSTRACT

Provided is an apparatus and method that may select a target for a wireless power transmission. A resonance power transmitter may include a source resonance unit including a plurality of source resonators that are each configured to transmit AC power to a resonance power receiver; a path-multiplexer configured to supply the AC power to each of the plurality of source resonators; a detector configured to transmit a wake-up signal to at least one resonance power receiver; and a source controller configured to control the path-multiplexer in order to transmit the AC power to the at least one detected resonance power receiver.

9 Claims, 19 Drawing Sheets

(56) References Cited

U.S. PATENT DOCUMENTS

| | | | |
|---|---|---|---|
| 2007/0145830 A1* | 6/2007 | Lee | H02J 5/005 307/135 |
| 2007/0236336 A1* | 10/2007 | Borcherding | G06K 7/0008 340/10.34 |
| 2008/0067874 A1 | 3/2008 | Tseng | |
| 2009/0303693 A1 | 12/2009 | Mao | |
| 2010/0072825 A1* | 3/2010 | Azancot | H02J 5/005 307/104 |
| 2010/0148723 A1* | 6/2010 | Cook | G06K 7/0008 320/108 |
| 2010/0201202 A1 | 8/2010 | Kirby et al. | |
| 2011/0156640 A1* | 6/2011 | Moshfeghi | H02J 7/025 320/108 |
| 2011/0285210 A1* | 11/2011 | Lemmens | H02J 5/005 307/104 |
| 2012/0049642 A1* | 3/2012 | Kim | H02J 5/005 307/104 |
| 2012/0112543 A1* | 5/2012 | van Wageningen | H02J 7/025 307/43 |

* cited by examiner

APPARATUS AND METHOD FOR RESONANCE POWER TRANSMISSION AND RESONANCE POWER RECEPTION

CROSS-REFERENCE TO RELATED APPLICATION(S)

This application claims the benefit under 35 U.S.C. § 119(a) of Korean Patent Application No. 10-2010-0084084, filed on Aug. 30, 2010, in the Korean Intellectual Property Office, the entire disclosure of which is incorporated herein by reference for all purposes.

TECHNICAL FIELD

The following description relates generally to apparatuses and methods for wireless power transmission.

BACKGROUND

As the demand for portable electrical devices has rapidly increased, use of wired power supplies for these devices has become inconvenient. Studies on wireless power transmission have been conducted to overcome inconveniences of wired power supplies and the limited capacity of conventional batteries. One conventional wireless power transmission technology may use a resonance characteristic of radio frequency (RF) devices. A typical wireless power transmission system using the resonance characteristic may include a source that supplies power and a target that receives power.

SUMMARY

According to an aspect, a resonance power transmitter may include: a source resonance unit including a plurality of source resonators that are each configured to transmit AC power to a resonance power receiver; a path-multiplexer configured to supply the AC power to each of the plurality of source resonators; a detector configured to transmit a wake-up signal to at least one resonance power receiver; and a source controller configured to control the path-multiplexer in order to transmit the AC power to the at least one detected resonance power receiver.

The source controller may control a switching signal in order to sequentially transmit the wake-up signal from each of the plurality of source resonators to the at least one resonance power receiver during a predetermined time period, and controls the source resonators based on the signal received from the at least one resonance power receiver during the predetermined time period.

When the at least one resonance power receiver is detected, the source controller may control an impedance of at least one of the plurality of source resonators corresponding to the at least one detected resonance power receiver in order to perform impedance matching between the at least one of the plurality of source resonators and the at least one detected resonance power receiver.

And when the at least one resonance power receiver is detected, the source controller may control a switching signal to select at least one of the plurality of source resonators corresponding to the at least one detected resonance power receiver in order to transmit the AC power to the at least one detected resonance power receiver.

At least one of the plurality of source resonators corresponding to the at least one detected resonance power receiver transmits the AC power to the at least one detected resonance power receiver during a predetermined time period.

The resonance power transmitter may also include a communication unit configured to receive, from the at least one detected resonance power receiver, the signal received in response to the wake-up signal, information associated with an identification (ID) of at least one resonator included in the at least one resonance power receiver, and information associated with an ID of the at least one resonance power receiver. The communication unit may obtain, from the at least one detected resonance power receiver, information for impedance matching between at least one of the plurality of source resonators corresponding to the at least one detected resonance power receiver and the at least one detected resonance power receiver.

And the source resonance unit may include an array of the multiple source resonators, with each of the plurality of source resonators configured to transmit a resonance power to a predetermined area of a target resonator of the at least one detected resonance power receiver.

According to an aspect, a resonance power receiver may comprising: a target resonance unit configured to receive, from a resonance power transmitter, an a wake-up signal; a power determining unit configured to determine whether a target resonator of the resonance power receiver is awakened by the wake-up; and a target controller configured to control an impedance of the awakened target resonator to perform impedance matching between a source resonator of the resonance power transmitter and the awakened target resonator.

The resonance power receiver may also include a communication unit configured to receive an ID of the resonance power transmitter and an ID of a source resonator included in the resonance power transmitter, and to transmit a signal in response to the wake-up signal, a charging request signal, information associated with an ID of an awakened target resonator, and information associated with an ID of an awakened resonance power receiver.

The target resonance unit may receive, from the resonance power transmitter, AC power during a predetermined time period. The resonance power receiver may also include an inductive coupling configured to receive AC power, the wake-up signal, or both. The power determining unit may be configured to determine whether the resonance power receiver is to be charged.

According to an aspect, a method of transmitting a resonance power may include: supplying AC power from a power supply to each of a plurality of source resonators; generating a wake-up signal for each of the plurality of source resonators; transmitting the wake-up signals to at least one resonance power receiver; detecting the at least one resonance power receiver by receiving from the at least one resonance power receiver a signal in response to one of the wake-up signals; and transmitting the AC power to the at least one detected resonance power receiver.

The method may further include controlling at least one of the plurality of sources resonator corresponding to the at least one resonance power receiver, based on the signal received from the at least one resonance power receiver during a predetermined time period. The method may further include controlling an impedance of at least one of the source resonators corresponding to the at least one detected resonance power receiver to perform impedance matching between the at least one of the plurality of source resonators and the at least one detected resonance power receiver. The method may further include controlling switching of at least one of the plurality of source resonators corresponding to the at least one detected resonance power receiver in order to transmit the AC power to the at least one detected resonance power receiver during a predetermined time period.

The method may further include receiving, from the at least one resonance power receiver, a signal in response to at least one of the wake-up signals; transmitting an information request signal that requests information associated with the at least one resonance power receiver, and transmitting an ID of the source resonator that receives the signal from the at least one resonance power receiver in response to one of the wake-up signals; and receiving an acknowledgement (ACK) signal with respect to the information request signal, information associated with an ID of at least one resonator included in the at least one resonance power receiver, and information associated with an ID of at least one resonance power receiver.

The method may further include obtaining, from the at least one detected resonance power receiver, information for impedance matching between at least one of the plurality of source resonators corresponding to that at least one detected resonance power receiver and the at least one detected resonance power receiver.

According to an aspect, a method of receiving a resonance power may include: receiving, from a resonance power transmitter, a wake-up signal; determining whether a target resonator of a resonance power receiver is awakened by the wake-up signal; and controlling an impedance of the awakened target resonator to perform impedance matching between a source resonator of the resonance power transmitter and the awakened target resonator.

The method may further include receiving an ID of the resonance power transmitter and an ID of a source resonator included in the resonance power transmitter, and transmitting a signal in response to the wake-up signal, a charging request signal, information associated with an ID of an awakened target resonator, and information associated with an ID of an awakened resonance power receiver.

For example, receiving the wake-up signal may include receiving, from the resonance power transmitter, AC power via an inductive coupling.

The method may also include determining whether the resonance power receiver is to be charged.

According to an aspect, a resonance power transmitter may include: a source resonator configured to transmit the resonance power to a resonance power receiver; a controller configured to transmit a wake-up signal to at least one resonance power receiver; and a path-multiplexer configured to supply AC power to the resonance power receiver in response to the wake-up signal from the plurality of resonators.

Other features and aspects may be apparent from the following detailed description, the drawings, and the claims.

Figure 1:
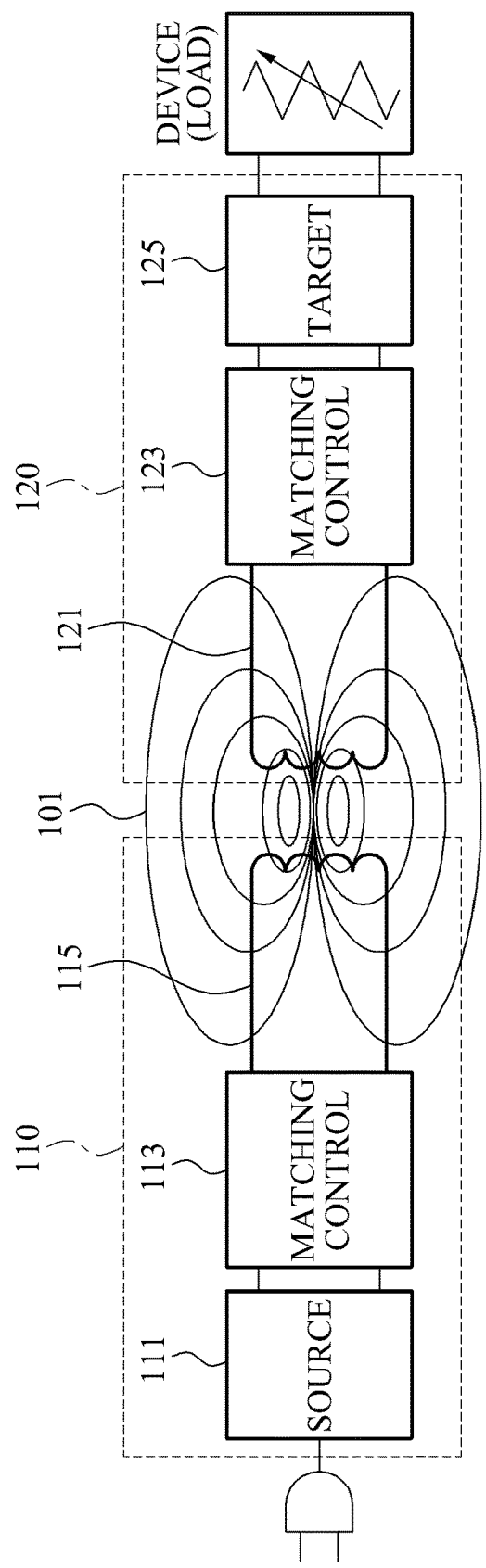
FIG. 1 is a diagram illustrating a wireless power transmission system.

Throughout the drawings and the detailed description, unless otherwise described, the same drawing reference numerals should be understood to refer to the same elements, features, and structures. In some instances, the relative size and depiction of these elements may have been exaggerated for clarity, illustration, and/or convenience.

DETAILED DESCRIPTION

The following detailed description is provided to assist the reader in gaining a comprehensive understanding of the methods, apparatuses and/or systems described herein. Of course, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a wireless power transmission system.

In one or more embodiments, wireless power transmitted using the wireless power transmission system may be resonance power. However, it will be appreciated that in other embodiments various other methodologies for electromagnetic power transmission may be used; including wired and wireless technologies, for instance.

The wireless power transmission system may have, for example, a source-target structure including at least a source and a target. As shown in FIG. 1, the wireless power transmission system may include a resonance power transmitter 110 corresponding to the source and a resonance power receiver 120 corresponding to the target being configured for the wireless transmission of electromagnetic energy.

The resonance power transmitter 110 may include a source unit 111 and a source resonator 115. The source unit 111 may be configured to receive energy from an external voltage supplier to generate resonance power. The resonance power transmitter 110 may further include a matching control 113 to perform resonance frequency or impedance matching for resonance power transmission via an inductive or magnetic coupling 101.

The source unit 111 may include, for example, one or more of: an alternating current (AC)-to-AC (AC/AC) converter, an AC-to-direct current (DC) (AC/DC) converter, and/or a (DC/AC) inverter. The AC/AC converter may adjust, to a desired level, a signal level of an AC signal input from an external device. The AC/DC converter may output a DC voltage at a predetermined level by rectifying an AC signal output from the AC/AC converter. The DC/AC inverter may generate an AC signal, for example, of a few megahertz (MHz) to tens of MHz band by quickly switching a DC voltage output from the AC/DC converter. AC voltage output having other frequencies is also possible.

The matching control 113 may be configured to set a resonance bandwidth of the source resonator 115, an impedance matching frequency of the source resonator 115 or both. The matching control 113 may include a source resonance bandwidth setting unit and/or a source matching frequency setting unit, for example. The source resonance bandwidth setting unit may be configured to set the resonance bandwidth of the source resonator 115. The source matching frequency setting unit may be configured to set the impedance matching frequency of the source resonator 115. In various implementations, a Q-factor of the source resonator 115 may be determined, for instance, based on setting of the resonance bandwidth of the source resonator 115 or setting of the impedance matching frequency of the source resonator 115.

The source resonator 115 may be configured to transmit electromagnetic energy wirelessly to a target resonator 121. For example, in one or more embodiments, the source resonator 115 may be configured to transmit the resonance power to the resonance power receiver 120 through the inductive coupling 101. The source resonator 115 may be configured to resonate within the set resonance bandwidth.

As shown in FIG. 1, the source resonator 115 may be configured to convert electrical energy into magnetic energy for wireless transmission of power through the inductive coupling 101 to the target resonator 121. The target resonator 121 in turn receives magnetic energy and converts the received magnetic energy into corresponding electrical energy. The source resonator 115 and the target resonator 121 forming the inductive coupling 101 may be configured, for example, in a helix coil structured resonator, a spiral coil structured resonator, a meta-structured resonator, or the like. As such, the resonator power transmitter 110 and the resonance power receiver may be physically spaced apart to permit power transmission inductively without any wired connections there between.

The resonance power receiver 120 may include the target resonator 121, a matching control 123 configured to perform resonance frequency or impedance matching, and a target unit 125 configured to transmit the received resonance power to a load.

The target resonator 121 may be configured to receive the electromagnetic energy from the source resonator 115. The target resonator 121 may also be configured to resonate within the set resonance bandwidth.

The matching control 123 may be configured to set at least one of a resonance bandwidth of the target resonator 121 and an impedance matching frequency of the target resonator 121. In various implementations, the matching control 123 may include a target resonance bandwidth setting unit and/or a target matching frequency setting unit with the target resonance bandwidth setting unit configured to set the resonance bandwidth of the target resonator 121 and the target matching frequency setting unit configured to set the impedance matching frequency of the target resonator 121. In some implementations, a Q-factor of the target resonator 121 may be determined based on setting of the resonance bandwidth of the target resonator 121 or setting of the impedance matching frequency of the target resonator 121.

The target unit 125 may be configured to transmit the received resonance power to the device (load). The target unit 125 may include, for example, an AC/DC converter and/or a DC/DC converter. In some implementations, the AC/DC converter may generate a DC voltage by rectifying an AC signal transmitted from the source resonator 115 to the target resonator 121. And the DC/DC converter may supply a rated voltage to a device or the load by adjusting a voltage level of the DC voltage.

Referring to FIG. 1, a process of controlling the Q-factor may include setting the resonance bandwidth of the source resonator 115 and the resonance bandwidth of the target resonator 121, and transmitting the electromagnetic energy from the source resonator 115 to the target resonator 121 through inductive coupling 101 between the source resonator 115 and the target resonator 121. The resonance bandwidth of the source resonator 115 may be set, for instance, to be wider or narrower than the resonance bandwidth of the target resonator 121. Accordingly, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

In wireless power transmission employing a resonance scheme, the resonance bandwidth can be an important factor. For example, with the Q-factor (considering, for instance, one or more of: a change in a distance between the source resonator 115 and the target resonator 121, a change in the resonance impedance, impedance mismatching, a reflected signal, and/or the like) denoted as Qt, it has been found that Qt may have an inverse-proportional relationship with the resonance bandwidth, as given by Equation 1.

$$\frac{\Delta f}{f_0} = \frac{1}{Qt} \qquad \text{[Equation 1]}$$
$$= \Gamma_{S,D} + \frac{1}{BW_S} + \frac{1}{BW_D}$$

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. The BW-factor may indicate either $1/BW_S$ or $1/BW_D$, for example.

Due to one or more external factors including, for example, a change in the distance between the source resonator 115 and the target resonator 121, a change in a location of at least one of the source resonator 115 and the target resonator 121, or the like, impedance mismatching between the source resonator 115 and the target resonator 121 can occur. The impedance mismatching may be a direct cause in decreasing an efficiency of power transfer. Thus, when a reflected wave corresponding to a transmission signal that is partially reflected and returned is detected, the matching control 113 may be configured to determine whether an impedance mismatching has occurred, and may also be configured to perform impedance matching. The matching control 113, for instance, may change a resonance frequency by detecting a resonance point through a waveform analysis of the reflected wave. In one implementation, the matching control 113 may determine the resonance frequency to be a frequency having a minimum amplitude in the waveform of the reflected wave.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

One or more of the materials of the embodiments described herein may be metamaterials. The magnetic permeability may indicate a ratio between a magnetic flux density occurring with respect to a given magnetic field in a corresponding material and a magnetic flux density occurring with respect to the given magnetic field in a vacuum state. The magnetic permeability and the permittivity, in some embodiments, may be used to determine a propagation constant of a corresponding material in a given frequency or a given wavelength. An electromagnetic characteristic of the corresponding material may be determined based on the magnetic permeability and the permittivity. According to an aspect, a metamaterial may be easily disposed in a resonance state without significant material size changes. This may be practical for a relatively large wavelength area or a relatively low frequency area, for instance.

Figure 2:
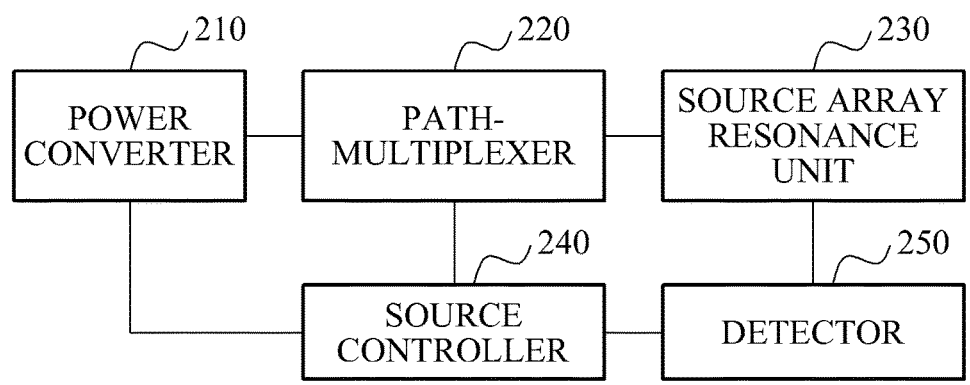
FIG. 2 is a block diagram illustrating a resonance power transmitter.

FIG. 2 illustrates a resonance power transmitter.

In more or more implementations, the resonance power transmitter may include a power amplifier. The power amplifier may employ a switching scheme to maximize efficiency. For example, second, third, fourth, fifth, . . . up to $N^{th}$ harmonics may be generated, while the power amplifier performs voltage/current switching. These harmonics may affect an adjacent device. It has been found, for instance, that as the number of resonance power receivers increases, the amount of resonance power also increases. This may result in the temperature of the total resonance power transmission system increasing and which may further result in increased power loss. Accordingly, the resonance power transmitter may be configured to charge multiple resonance power receivers, while maintaining an amount of transmitted resonance power. As a result, the number of harmonics may be minimized.

Referring to FIG. 2, the resonance power transmitter may include, for example, a power converter 210, a path-multiplexer 220, a source array resonance unit 230, a source controller 240, and a detector 250.

The power converter 210 may be configured to convert DC voltage to AC voltage, based on a predetermined switching pulse signal. For instance, the power converter 210 may include a DC/AC inverter that is configured to generate a resonance power by converting a DC signal of a predetermined level to an AC signal. The DC/AC inverter may also include a switching device to enable high-speed switching. For example, the switching device may be turned 'on' when the switching pulse signal is 'high', and may be turned 'off' when the switching pulse signal is 'low'.

The path-multiplexer 220 may be configured to perform switching to enable AC power to be transmitted to a plurality of source resonators. In various embodiments, the path-multiplexer 220 may be configured to perform switching to enable AC power to be sequentially transmitted to each of a plurality of source resonators. For instance, the path-multiplexer 220 may be configured to selectively switch a path through which the AC power is transmitted, to enable the AC power to be transmitted to the each of the source resonators. In one implementation, the path-multiplexer 220 may transmit the AC power to a first source resonator, and may perform switching, after a predetermined time, to enable the AC power to be secondarily transmitted to a second source resonator. It will be appreciated that additional source resonators may be handled in an analogous manner.

The source array resonator 230 may include a plurality of source resonators that transmit AC power to a resonance power receiver. The source array resonance unit 230 may include, for example, an array of source resonators, with each of the source resonators configured to transmit a resonance power to a corresponding predetermined area. The source resonators, however, do not need be arranged in an array, in all embodiments. The predetermined area to which a resonance power is transmitted may be allocated for each source resonator, for instance, with each source resonator being configured to transmit, to a resonance power receiver located a corresponding allocated area, a wake-up power signal or an AC power to be used for charging via an inductive coupling. Multiple resonance power receivers in turn may be located in an area allocated to, or corresponding to, each source resonator. Accordingly, each of the source resonators may be configured to transmit a resonance power to the multiple resonance power receivers located in the corresponding allocated area. The wake-up power signal may be a power signal having sufficient power that allows a resonance power receiver to transmit a message associated with a state of the resonance power receiver. Power may be wirelessly transmitted by waves propagated by a source resonator, for instance, as described herein.

The source controller 240 may be configured to control the path-multiplexer 220 in order to enable the source array resonance unit 230 to transmit AC power to at least one resonance power receiver detected by the detector 250. When the at least one resonance power receiver is detected by the detector 250, the source controller 240 may control the path-multiplexer 220 to enable at least one source resonator located in at least one detected area corresponding to the at least one detected resonance power receiver to transmit the AC power. In addition, when the detector 250 detects the at least one resonance power receiver, the source controller 240 may control the path-multiplexer, and may then transmit, after the detection, the AC power to the at least one detected resonance power receiver. In some instances, transmission may occur immediately after the detection.

The source controller 240 may be configured to control a switching signal to enable a wake-up signal to be sequentially transmitted to the at least one resonance power receiver during a predetermined time period, and may control a corresponding source resonator based on a signal received from the at least one resonance power receiver during a predetermined time period. For example, the source controller 240 may control the switching signal of the path-multiplexer 220 to enable a wake-up signal to be transmitted, at regular intervals, to each area where a source resonator may be located. The wake-up signal may include the wake-up power signal. If a signal in response to the wake-up signal or a charging request signal is not received in an area where the wake-up signal is transmitted during a predetermined time period, the source controller 240 may maintain a state of a source resonator located in a corresponding location to be in an 'off' state. In some instances, when information associated with an identification (ID) of a target resonator and/or information associated with an ID of the resonance power receiver is received from the resonance power receiver, the source controller 240 may control a switching signal to enable the wake-up signal to be transmitted from a subsequent source resonator.

In various implementations, when at least one resonance power receiver is detected, the source controller 240 may control an impedance of at least one source resonator corresponding to the at least one detected resonance power receiver in order to perform impedance matching between the at least one detected resonance power receiver and the at least one source resonator corresponding to the at least one detected resonance power receiver. When the at least one resonance power receiver is detected, the source controller 240 may be configured to control the impedance in order to enable the at least one source resonator located in at least one location where the at least one resonance power receiver is detected to efficiently transmit a resonance power. For example, the source controller 240 may control the impedance, by one or more of: an amount of a mismatched impedance occurring due to a distance between a source resonator and a target resonator included in the resonance power receiver, a difference in load impedance between the source resonator and the target resonator, or the like.

Moreover, in various implementations, when the at least one resonance power receiver is detected, the source controller 240 may control a switching signal to enable the at least one source resonator corresponding to the at least one detected resonance power receiver to transmit, during a predetermined time period, AC power to the at least one detected resonance power receiver. The predetermined time periods may include, for example, regular or constant intervals of time. The source controller 240 may control the path-multiplexer 220 to enable the first source resonator to transmit the AC power during a predetermined time period, to perform switching, and to enable the second source resonator to transmit the AC power during the predetermined time period. For example, a source resonator that transmits the AC power may correspond to a detected resonance power receiver. According to an aspect, a device may be charged with a predetermined AC power, by distributing and transmitting, based on a time, the predetermined AC power to the multiple resonance power receivers. For example, the device may be charged with a relatively small amount of AC power and thus, a power loss caused by a harmonic in the resonance power transmitter may be decreased.

The source controller 240 may control at least one of the source resonators corresponding to at least one of the detected resonance power receivers to enable that source resonator to transmit AC power.

The detector 250 may be configured to generate, using the AC power, the wake-up signal that wakes up at least one resonance power receiver. In various implementations, the detector 250 may be configured to detect at least one resonance power receiver based on a signal received in response to the wake-up signal. The detector 250 may generate, using AC power, a wake-up signal to detect whether a resonance power receiver exists in an area where a source resonator is located, for instance. And the detector 250 may detect the resonance power receiver when a signal in response to the wake-up signal is received from the resonance power receiver. For example, the detector 250 may detect multiple resonance power receivers based on a wake-up signal transmitted from a single source resonator. And when the single source resonator receives the signal in response to the wake-up signal from one or more resonance power receivers located in an area where the single source resonator is able to transmit a resonance power, the one or more of the resonance power receivers may be detected.

The resonance power transmitter may include a communication unit, for example. The communication unit may receive, from the at least one resonance power receiver, one or more of: signal(s) in response to a wake-up signal, information associated with an ID of at least one resonator included in the at least one resonance power receiver, information associated with an ID of the at least one resonance power receiver, or the like.

The communication unit may then obtain, from the at least one detected resonance power receiver, information to be used for impedance matching between the at least one source resonator and the at least one detected resonance power receiver. Communications may take place, for example, via an in-band communication or an out-band communication. The information used for impedance matching may include, for instance, one or more of: a distance between a source resonator and a target resonator, a location of the source resonator and the target resonator, a difference in load impedance between the source resonator and the target resonator, a reflection coefficient of a wave radiated from the source resonator to the target resonator, a power transmission gain, coupling efficiency, or the like. The in-band communication may denote transmission and reception of data with a resonance power receiver through a resonance frequency, and the out-band communication may denote transmission and reception of data with a resonance power receiver through a frequency allocated for data communication.

Figure 3:
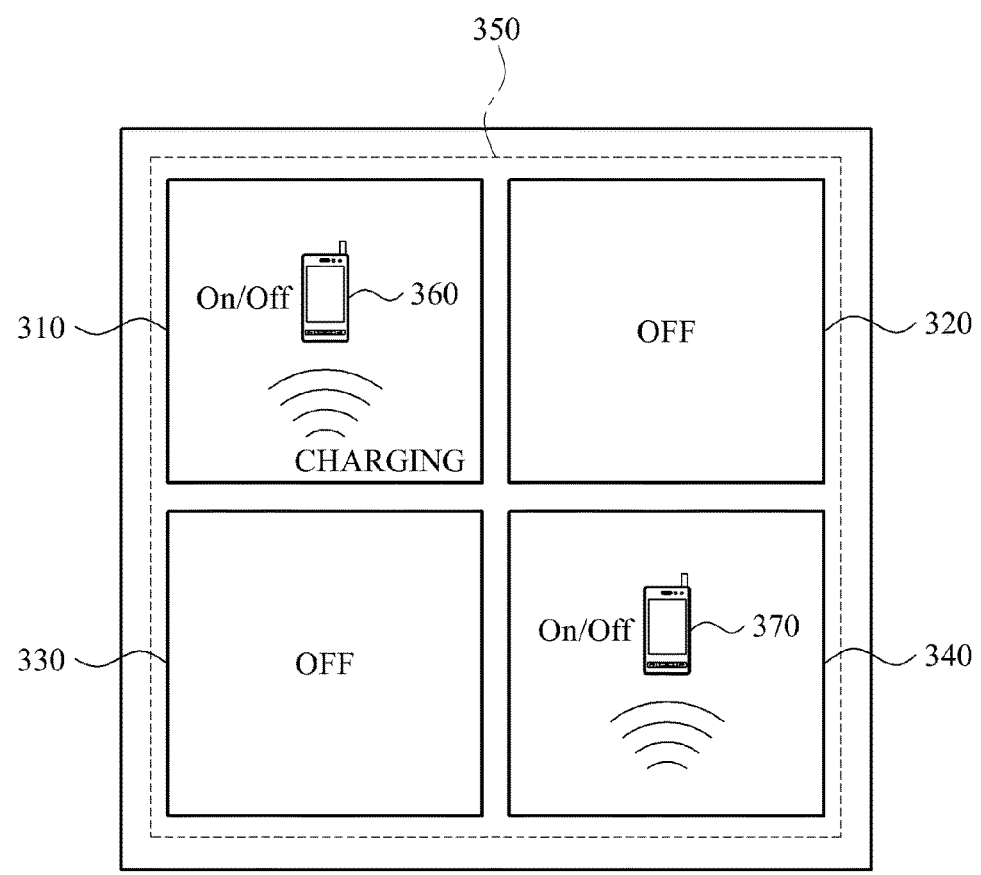
FIG. 3 is a diagram illustrating a source array resonance unit.

FIG. 3 illustrates one exemplary source array resonance unit 230 of FIG. 2.

Referring to FIG. 3, a source array resonance unit 350 may be configured in one embodiment by forming an array with four source resonators: source resonator A 310, source resonator B 320, source resonator C 330, and source resonator D 340. When a wake-up signal is transmitted from the source resonator A 310 to a resonance power receiver 360, the resonance power receiver 360 may receive the wake-up signal and transmit a signal in response to wake-up signal back to the source resonator A 310 which enables the source resonator A 310 to detect the corresponding resonance power receiver 360. Once the resonance power receiver 360 is detected, a state of the source resonator 310 may be changed to be in an 'on' state and thus, a resonance power may be transmitted to the resonance power receiver 360. On the other hand, if no signal is received in response to the wake-up signal during a predetermined time period, the source array resonance unit 350 may switch from the source resonator A 310 to a different source resonator, for example, the source resonator B 320. And if a response signal is not received during the predetermined time period after the source resonator B 320 transmits the wake-up signal, the source resonator B 320 may maintain a state of the source resonator B 320 to be in an 'off' state. Similarly, each of the source resonator C 330 and the source resonator D 340 may repeat a detecting process and a resonance power transmitting process. As shown, for example, the source resonator C 330 is maintained in an 'off' state and the source resonator D 340 in maintained in an 'on' state with resonance power receiver 370 having been detected.

Figure 4:
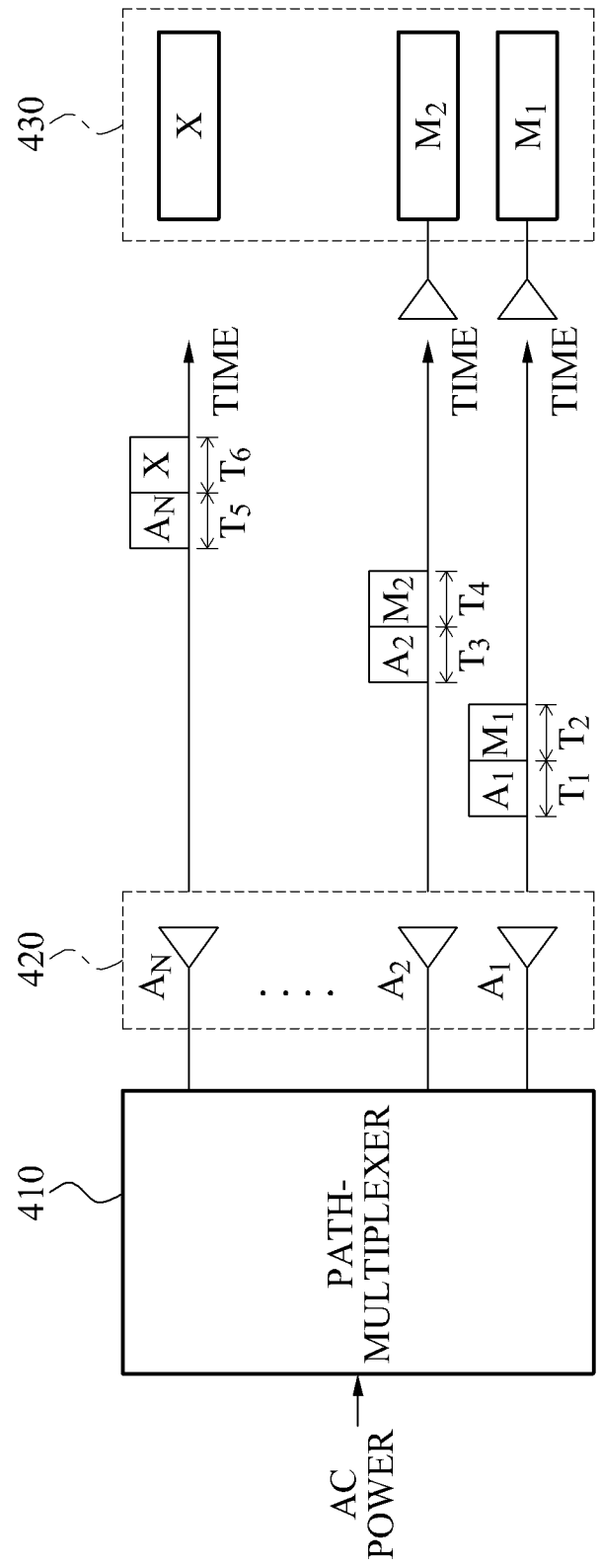
FIG. 4 is a diagram illustrating a path-multiplexer.

FIG. 4 illustrates one exemplary path-multiplexer 220 of FIG. 2.

Referring to FIG. 4, a path-multiplexer 410 may be configured to perform switching to enable an inputted AC power signal to be sequentially transmitted to a plurality of source resonators 420: $A_1$, $A_2$, . . . , and $A_N$, to target resonators: $M_1$, $M_2$, . . . , and X. First, the source resonator $A_1$ may transmit to a target resonator $M_1$, an ID of the source resonator $A_1$ and a wake-up power signal. The target resonator $M_1$ may be awakened by the wake-up power signal, and may transmit a location of the target resonator $M_1$ by transmitting a state signal indicating that the target resonator $M_1$ is active, an ID of target resonator $M_1$, and an ID of a resonance power receiver including the target resonator $M_1$. Accordingly, the target resonator $M_1$ may be detected through the above described process. And when the information is received from the target resonator $M_1$, the source resonator $A_1$ is switched to the source resonator $A_2$. $T_1$ may denote a time expended by the source resonator $A_1$ for transmitting the ID of the source resonator $A_1$ and the wake-up power signal. $T_2$ may denote a time expended for receiving information associated with the target resonator $M_1$ from the target resonator $M_1$. The source resonator $A_2$ may similarly perform the above described process to detect the target resonator $M_2$. In a similar manner, $T_3$ may denote a time expended by the source resonator $A_2$ for transmitting the ID of the source resonator $A_2$ and the wake-up power signal and $T_4$ may denote a time expended for receiving information associated with the target resonator $M_2$ from the target resonator $M_2$. $T_5$ and $T_6$ may denote similar times periods corresponding to source resonator $A_N$.

In some instances, a corresponding target resonator X may not exist or otherwise be detected for the source resonator $A_N$. Accordingly, in such cases, if a wake-up signal or a large reflection signal is not received during a predetermined time period, the path-multiplexer 410 may determine or conclude that the target resonator does not exist and may maintain a state of the source resonator $A_N$ in an 'off' state. Subsequently, switching may be performed from the source resonator $A_N$ to a subsequent source resonator, if available, for additional target resonator detecting.

Figure 5:
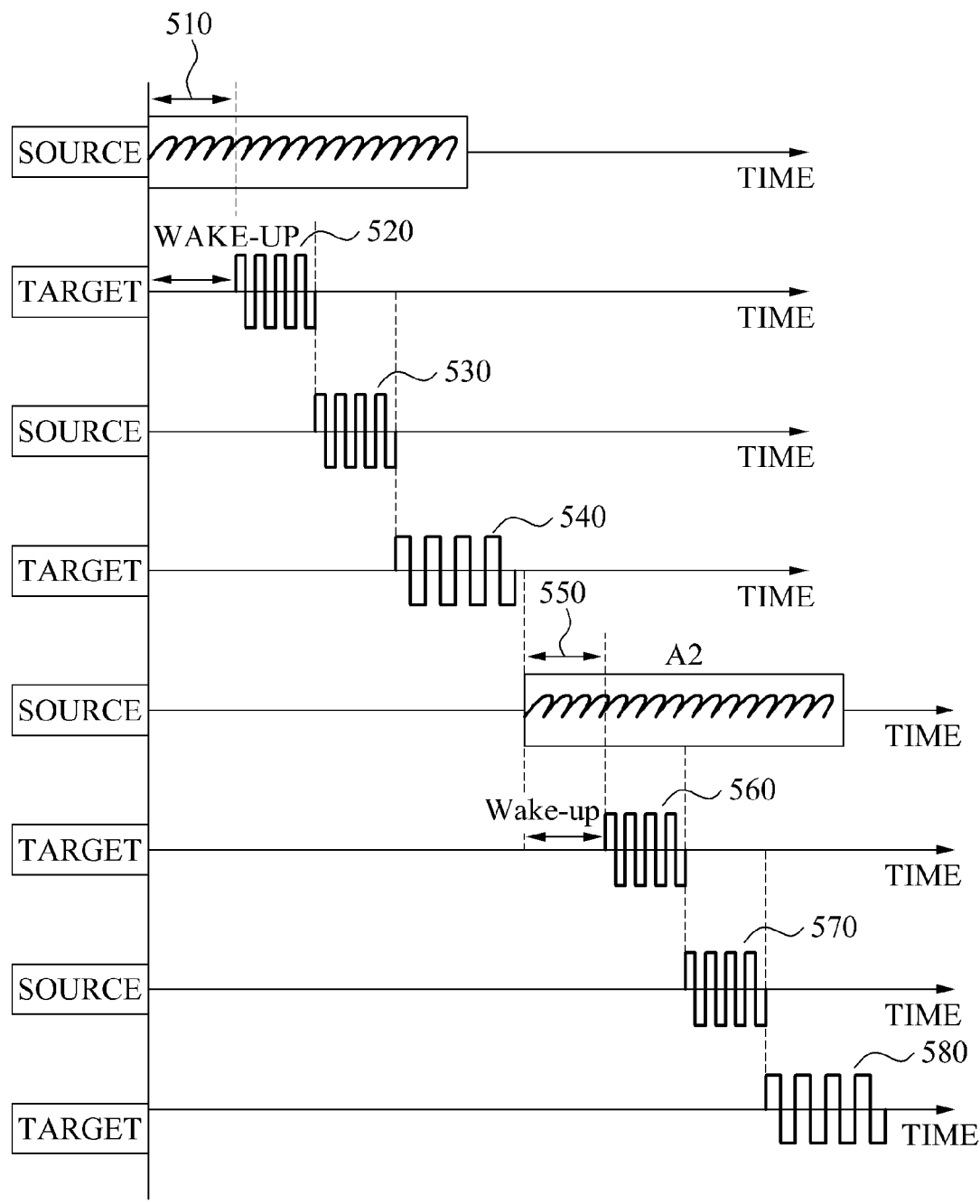
FIG. 5 is a diagram illustrating a process of detecting a resonance power receiver.

FIG. 5 illustrates a process of detecting a resonance power receiver.

Referring to FIG. 5, a process that detects resonance power receivers through operations of two source resonators $A_1$ and $A_2$ is described. First, the source resonator $A_1$ may transmit a wake-up signal in a time period 510, in order to determine whether a first target resonator exists in a corresponding area. The corresponding area may denote an area where the source resonator $A_1$ transmits a resonance power. The first target resonator may transmit a signal in response to the wake-up signal in a time period 520. The source resonator $A_1$ receives the response signal and then may transmit an ID of the source resonator $A_1$ and information request signal that requests information associated with the first target resonator in a time period 530. The first target resonator may receive the information request signal, and may transmit information associated with an ID of the first target resonator and information associated with an ID of a resonance power receiver including the first target resonator in a time period 540. In some instances, the information associated with the ID of the first target resonator and information associated with the ID of the resonance power receiver including the first target resonator may be transmitted together with the response signal with respect to the wake-up signal. A resonance power transmitter may detect the resonance power receiver by receiving the information associated with the ID of the first target resonator and the ID of the resonance power receiver including the first target resonator. In some instances, the path-multiplexer 220 may perform switching to enable a subsequent resonator $A_2$ to transmit a wake-up signal in a time period 550. A second target resonator may transmit a response signal with respect to the wake-up signal in a time period 560. The source resonator $A_2$ receives a response signal may then transmit an ID of the source resonator $A_2$ and an information request signal that requests information associated with the second target resonator in a time period 570. The second target resonator may receive the information request signal, and may transmit information associated with an ID of the second target resonator and information associated with an ID of a resonance power receiver including the second target resonator in a time period 580. The resonance power transmitter may sequentially detect resonance power receivers by repeatedly performing the above described process.

Figure 6:
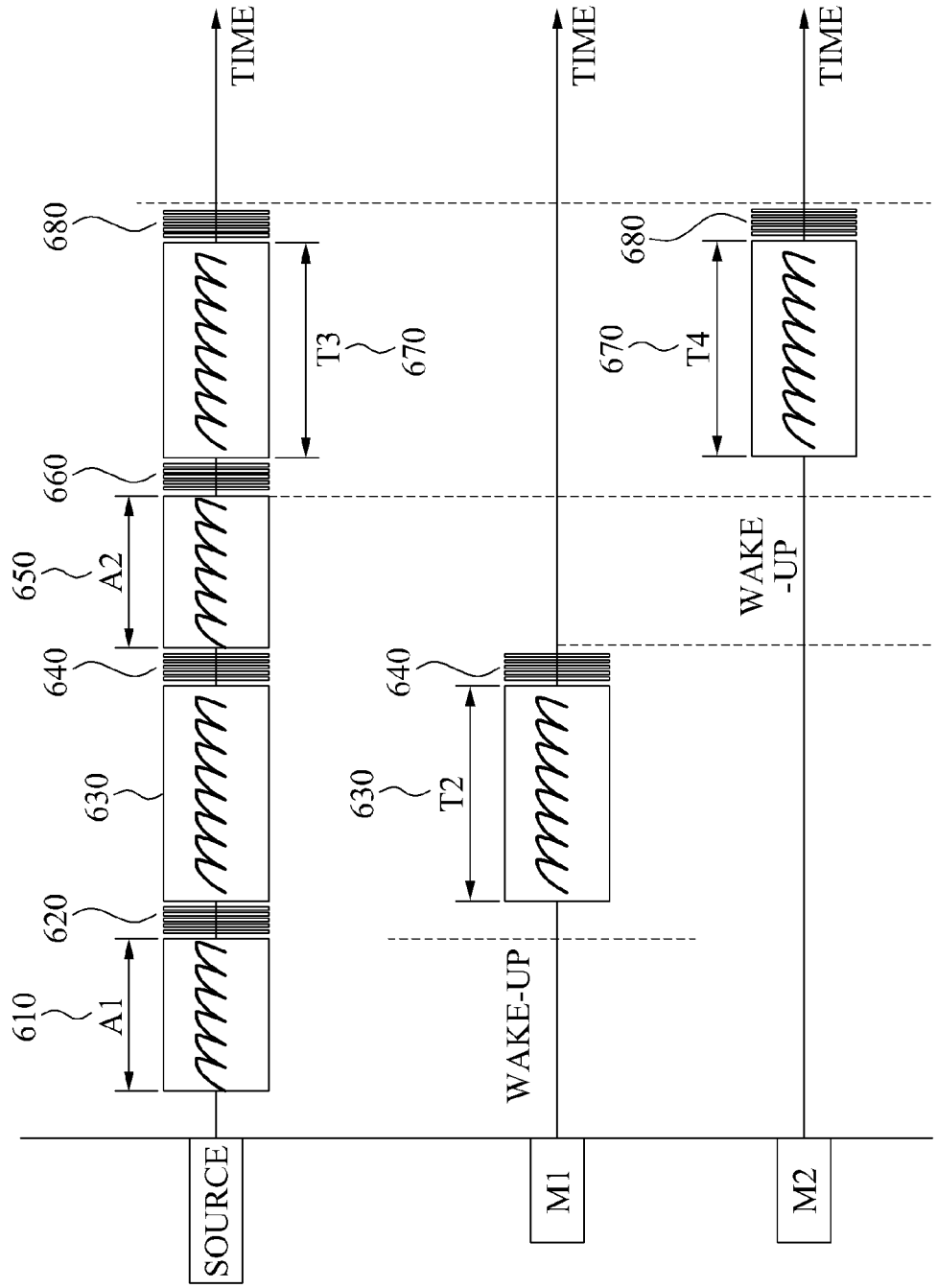
FIG. 6 is a diagram illustrating a process of impedance matching between a source resonator and a target resonator.

FIG. 6 illustrates a process of impedance matching between a source resonator and a target resonator.

Referring to FIG. 6, a source resonator $A_1$ may transmit an ID of the source resonator $A_1$ and a wake-up signal in a time period 610 to a target resonator $M_1$. Transmission and reception of information associated with an ID of the target resonator $M_1$ and information associated with an ID of the target resonator $M_1$ from the source resonator $A_1$ may occur in a time period 620.

A resonance power transmitter may detect the target resonator $M_1$ through the above described process. For example, the source power transmitter may perform impedance matching between the source resonator $A_1$ and the target resonator $M_1$ through the source controller 240 in a time period 630. When the impedance matching is performed, a resonance power may be effectively transmitted at a resonance frequency. After a time period 640 for performing switching from the source resonator $A_1$ to a source resonator $A_2$, the source resonator $A_2$ may transmit an ID of the source resonator $A_2$ and a wake-up signal in a time period 650 to a resonance resonator $M_2$. Transmission and reception of information associated with an ID of the target resonator $M_2$ and information associated with an ID of a resonance power receiver including the target resonator $M_2$ from the source resonator $A_2$ may occur in a time period 660.

The target power transmitter may detect the target resonator $M_2$ through the above described process. The resonance power transmitter may perform impedance matching between the source resonator $A_2$ and the target resonator $M_2$, using the source controller 240 in a time period 670. Accordingly, the resonance power transmitter may detect a target resonator (e.g., the target resonator $M_1$ or the target resonator $M_2$) and may perform impedance matching with a source resonator (e.g., the source resonator $A_1$ or the source resonator $A_2$) using the above described processes. Switching to a subsequent source resonator may be performed in a time period 680 in an analogous manner.

Figure 7:
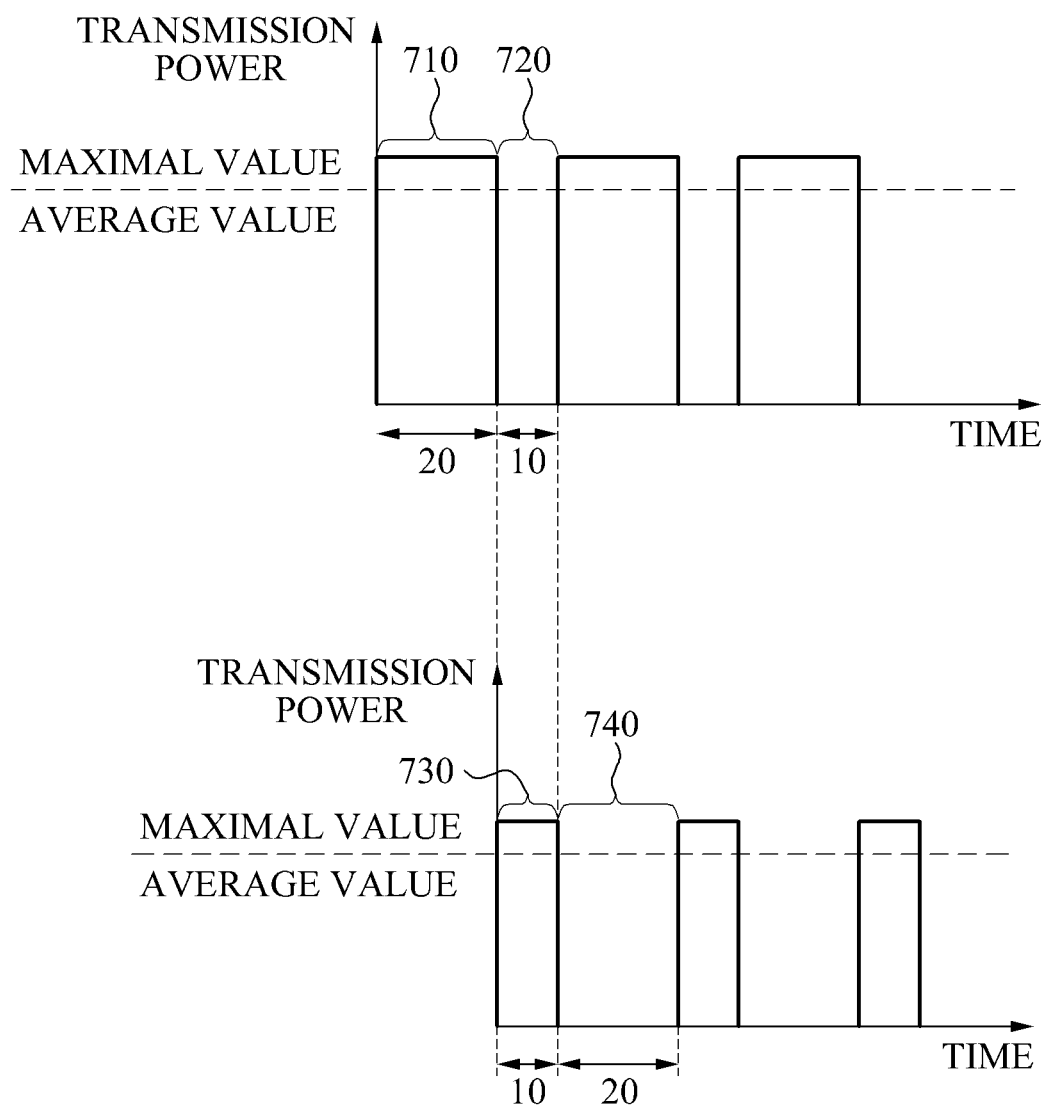
FIG. 7 is a diagram illustrating a process of transmitting an AC power during predetermined regular intervals.

FIG. 7 illustrates a process of transmitting an AC power during predetermined regular intervals.

Referring to FIG. 7, the source controller 240 may be configured to control a transmitted average power by controlling an on/off switching time of a source resonator $A_1$. The source controller 240 may control regular intervals of the source resonator $A_1$ to control a reception power of a resonance power receiver. The regular intervals of time have been arbitrarily illustrated in FIG. 7, for instance, as 10 and 20 in FIG. 7. Although, it should be appreciated that other intervals of time are possible.

The source controller 240 may control the source resonator $A_1$ to transmit a resonance power during a predetermined time 710, and may control the source resonator $A_1$ to stop transmitting the resonance power during a predetermined time 720. When the source resonator $A_1$ stops transmitting the resonance power during the time period 720, the source controller 240 may enable a source resonator $A_2$ to transmit a resonance power during a time period 730. The source controller 240 may control the path-multiplexer 220 to transmit predetermined AC power to multiple source resonators, the source resonator $A_1$ and the source resonator $A_2$. Time period 740 corresponds to the transmission from the source resonator $A_2$ being stopped during the next transmission of the source $A_1$. The process similarly repeats for subsequent transmissions. Therefore, each of the source resonator $A_1$ and the source resonator $A_2$ may transmit the resonance power to a target resonator of a corresponding area and the resonance power may be equally transmitted to multiple resonance power receivers. The source resonator $A_1$ and the source resonator $A_2$ may charge the multiple resonance power receivers by transmitting a relatively small amount of power. Thus, even though the source resonator $A_1$ and the source resonator $A_2$ may transmit only a small amount of power, the resonance power receiver may receive an average amount of power, which may be equivalent to receiving a relatively greater amount of power.

Figure 8:
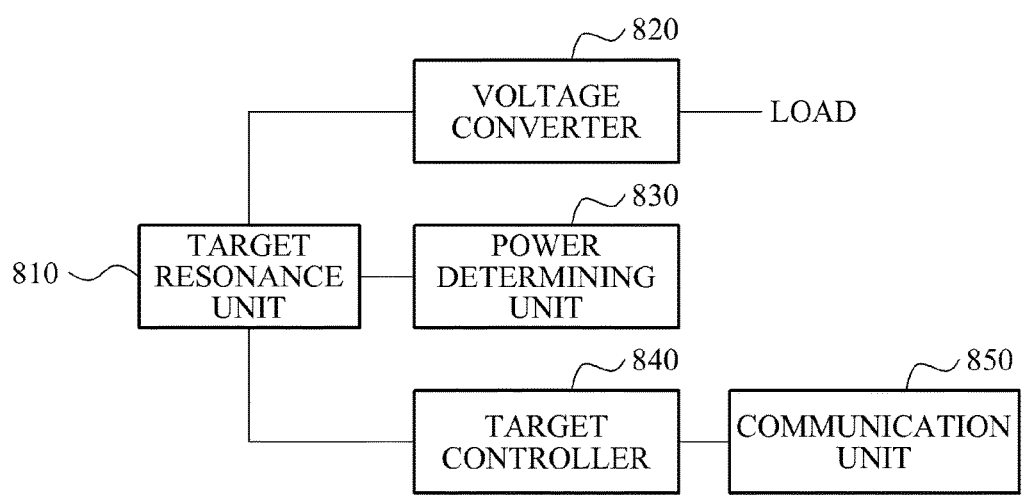
FIG. 8 is a block diagram illustrating a resonance power receiver.

FIG. 8 illustrates a resonance power receiver.

Referring to FIG. 8, the resonance power receiver may include a target resonance unit 810, a voltage converter 820, a power determining unit 830, a target controller 840, and a communication unit 850.

The target resonator unit 810 may be configured to receive, from a resonance power transmitter, an AC power or a wake-up signal, via an inductive coupling. For example, the target resonance unit 810 may receive, from the resonance power transmitter, an AC power during predetermined regular intervals, via the inductive coupling. As such, the target resonance unit 810 may receive the AC power during the predetermined regular intervals and the target resonance unit 810 may receive an amount of the power being substantially equivalent to an amount of power of when the AC power is continuously received from a single source resonator.

The voltage converter 820 may be configured to receive incoming AC power to supply a load with DC voltage. For example, the voltage converter 820 may include an AC/DC converter converting an AC signal to a DC signal and/or a DC/DC converter for adjusting a signal level of the DC signal.

The power determining unit 830 may be configured to determine whether the resonance power receiver and the target resonator are awaken by a wake-up signal or whether the resonance power receiver is to be charged. The power determining unit 830 may then determine whether a response signal with respect to the wake-up signal of the source resonator is generated. For example, the power determining unit 830 may determine whether the resonance power receiver is to be charged, based on an internal condition of the resonance power receiver. The internal condition may include, for instance, one or more of following: whether the resonance power receiver is used, a lifespan of a battery, a charged level of the battery, or the like.

The target controller 840 may be configured to control an impedance so as to perform impedance matching between the source resonator and the awaken target resonator.

The communication unit 850 may be configured to receive an ID of the resonance power transmitter and an ID of the source resonator included in the resonance power transmitter, and transmit a signal in response to the wake-up signal, a charging request signal, information associated with an ID of the awakened target resonator, and information associated with an ID of the awakened resonance power receiver. For instance, the communication unit 850 may receive the information associated with the ID of the resonance power transmitter and information associated with the ID of the source resonator included in the resonance power transmitter, via an in-band communication or an out-band communication, and may transmit the response signal to the wake-up signal, the charging request signal, the information associated with the ID of the awaken target resonator, and information associated with the ID of the awaken resonance power receiver, via an in-band communication or an out-band communication.

Figure 9:
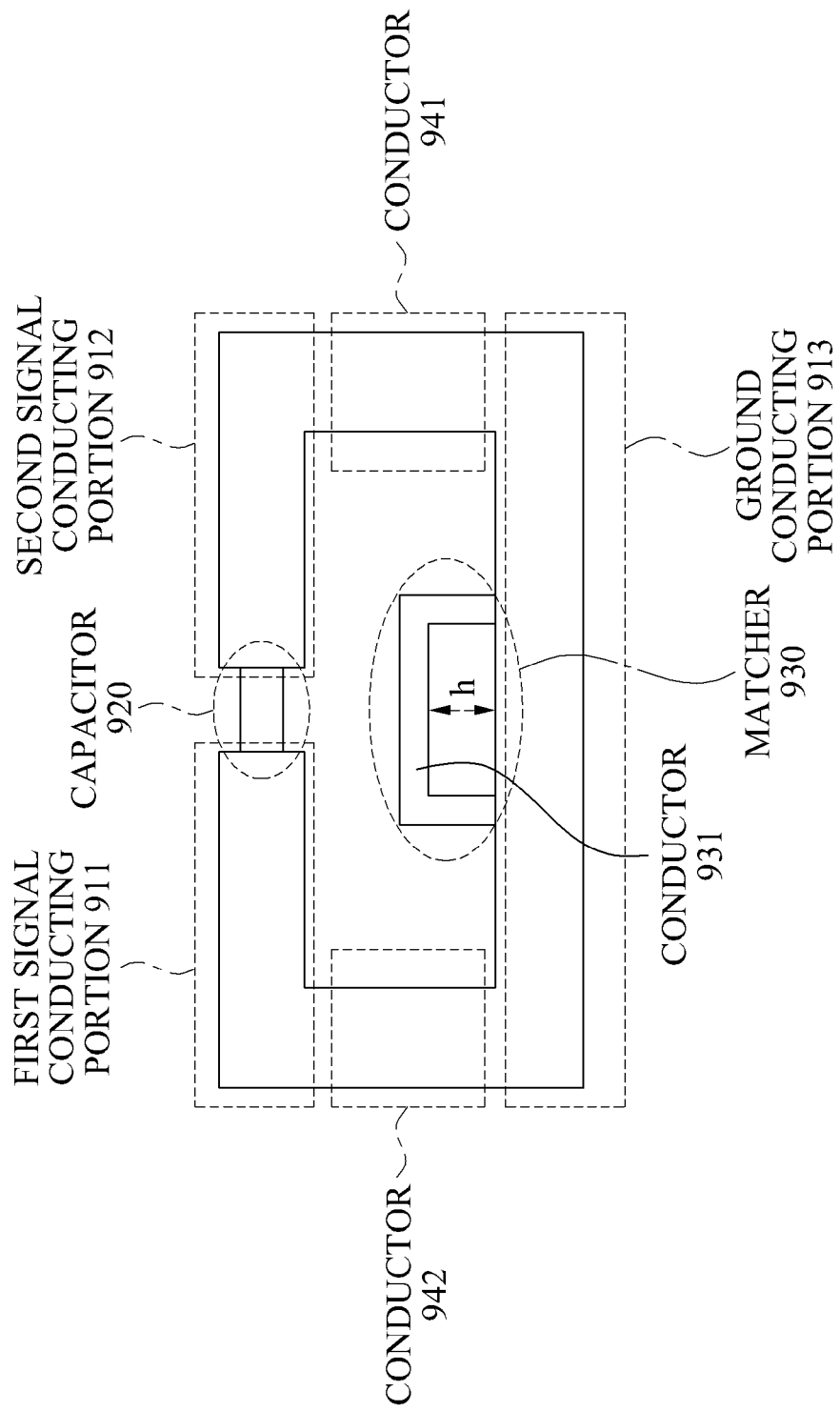
FIG. 9 is a diagram illustrating a resonator having a two-dimensional (2D) structure.

FIG. 9 illustrates a resonator 900 having a two-dimensional (2D) structure.

Referring to FIG. 9, the resonator 900 having the 2D structure may include a transmission line, a capacitor 920, a matcher 930, and conductors 941 and 942. The transmission line may include, for instance, a first signal conducting portion 911, a second signal conducting portion 912, and a ground conducting portion 913.

The capacitor 920 may be inserted or otherwise positioned in series between the first signal conducting portion 911 and the second signal conducting portion 912, so that an electric field may be confined within the capacitor 920. In various implementations, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded.

As shown in FIG. 9, the resonator 900 may be configured to have a generally 2D structure. The transmission line may include the first signal conducting portion 911 and the second signal conducting portion 912 in the upper portion of the transmission line, and may include the ground conducting portion 913 in the lower portion of the transmission line. As shown, the first signal conducting portion 911 and the second signal conducting portion 912 may be disposed to face the ground conducting portion 913. The current may flow through the first signal conducting portion 911 and the second signal conducting portion 912.

In some implementations, one end of the first signal conducting portion 911 may be electrically connected (i.e., shorted) to the conductor 942, and another end of the first signal conducting portion 911 may be connected to the capacitor 920. And one end of the second signal conducting portion 912 may be grounded to the conductor 941, and another end of the second signal conducting portion 912 may be connected to the capacitor 920. Accordingly, the first signal conducting portion 911, the second signal conducting portion 912, the ground conducting portion 913, and the conductors 941 and 942 may be connected to each other, such that the resonator 900 has an electrically closed-loop structure. The term "closed-loop structure," as used herein, may include a polygonal structure, for example, a circular structure, a rectangular structure, or the like that is electrically closed.

The capacitor 920 may be inserted into an intermediate portion of the transmission line. For example, the capacitor 920 may be inserted into a space between the first signal conducting portion 911 and the second signal conducting portion 912. The capacitor 920 may be configured, in some instances, as a lumped element, a distributed element, or the like. In one implementation, a distributed capacitor may be configured as a distributed element and include zigzagged conductor lines and a dielectric material having a relatively high permittivity between the zigzagged conductor lines.

When the capacitor 920 is inserted into the transmission line, the resonator 900 may have a property of a metamaterial, as discussed above. For example, the resonator 900 may have a negative magnetic permeability due to the capacitance of the capacitor 920. If so, the resonator 900 may be referred to as a mu negative (MNG) resonator. Various criteria may be applied to determine the capacitance of the capacitor 920. For example, the various criteria for enabling the resonator 900 to have the characteristic of a metamaterial may include one or more of the following: a criterion for enabling the resonator 900 to have a negative magnetic permeability in a target frequency, a criterion for enabling the resonator 900 to have a zeroth order resonance characteristic in the target frequency, or the like. The resonator 900, also referred to as the MNG resonator 900, may also have a zeroth order resonance characteristic (i.e., having, as a resonance frequency, a frequency when a propagation constant is "0"). If the resonator 900 has a zeroth order resonance characteristic, the resonance frequency may be independent with respect to a physical size of the MNG resonator 900. Moreover, by appropriately designing the capacitor 920, the MNG resonator 900 may sufficiently change the resonance frequency without substantially changing the physical size of the MNG resonator 900.

In a near field, for instance, the electric field may be concentrated on the capacitor 920 inserted into the transmission line. Accordingly, due to the capacitor 920, the magnetic field may become dominant in the near field. In one or more embodiments, the MNG resonator 900 may have a relatively high Q-factor using the capacitor 920 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 900 may include a matcher 930 configured for impedance matching. For example, the matcher 930 may be configured to appropriately determine and adjust the strength of a magnetic field of the MNG resonator 900, for instance. Depending on the configuration, a current may flow in the MNG resonator 900 via a connector, or may flow out from the MNG resonator 900 via the connector. The connector may be connected to the ground conducting portion 913 or the matcher 930. In some instances, power may be transferred through coupling without using a physical connection between the connector and the ground conducting portion 913 or the matcher 930.

As shown in FIG. 9, the matcher 930 may be positioned within the loop formed by the loop structure of the resonator 900. The matcher 930 may adjust the impedance of the resonator 900 by changing the physical shape of the matcher 930. For example, the matcher 930 may include the conductor 931 for the impedance matching positioned in a location that is separate from the ground conducting portion 913 by a distance h. Accordingly, the impedance of the resonator 900 may be changed by adjusting the distance h.

In some instances, a controller may be provided to control the matcher 930 which generates and transmits a control signal to the matcher 930 directing the matcher 930 to change its physical shape so that the impedance of the resonator 900 may be adjusted. For example, the distance h between the conductor 931 of the matcher 930 and the ground conducting portion 913 may be increased or decreased based on the control signal. The controller may generate the control signal based on various factors.

As shown in FIG. 9, the matcher 930 may be configured as a passive element such as, for example, the conductor 931. Of course, in other embodiments, the matcher 930 may be configured as an active element such as, for example, a diode, a transistor, or the like. If the active element is included in the matcher 930, the active element may be driven based on the control signal generated by the controller, and the impedance of the resonator 900 may be adjusted based on the control signal. For example, when the active element is a diode included in the matcher 930, the impedance of the resonator 900 may be adjusted depending on whether the diode is in an 'on' state or in an 'off' state.

In some instances, a magnetic core may be further provided to pass through the MNG resonator 900. The magnetic core may perform a function of increasing a power transmission distance.

Figure 10:
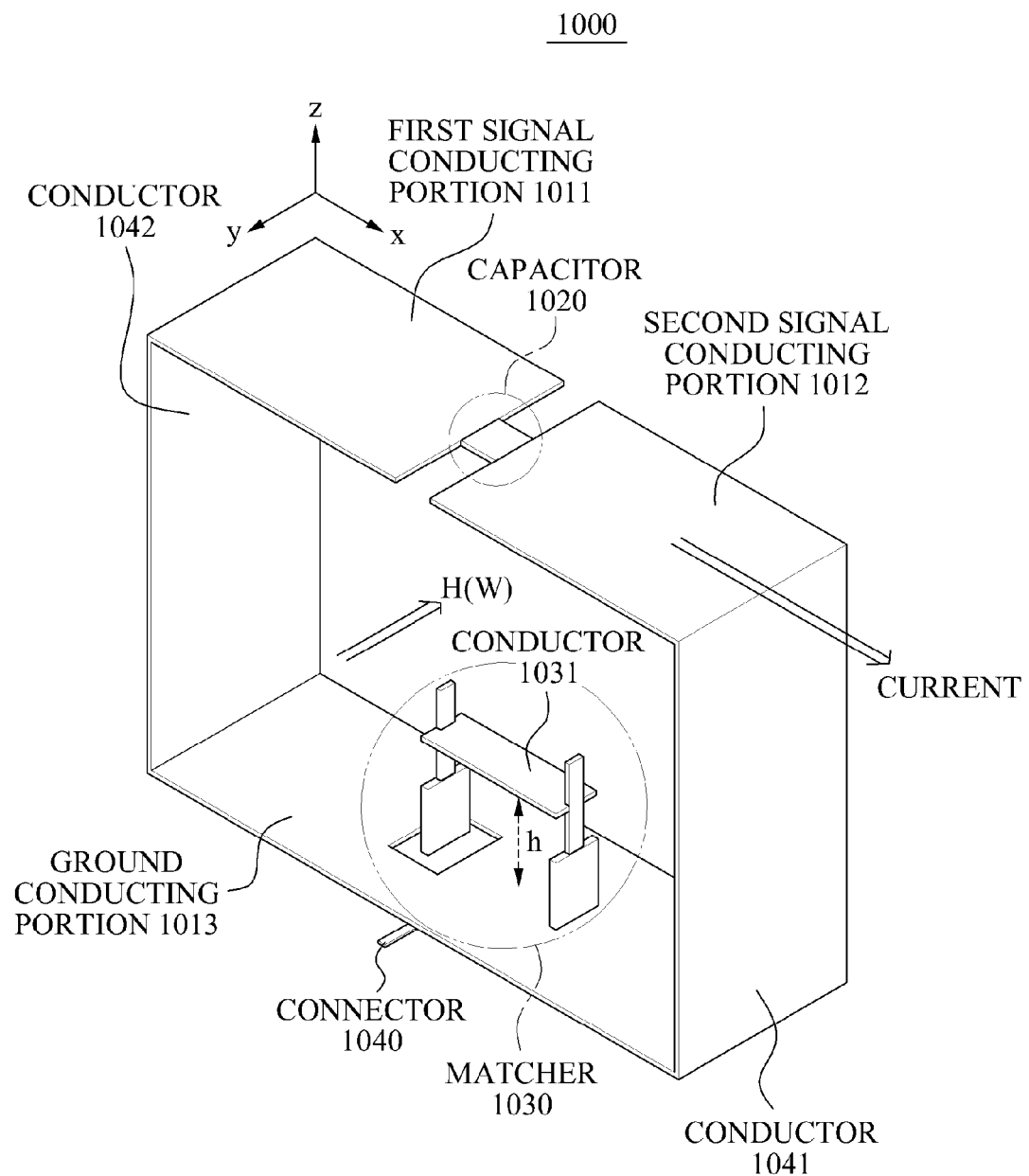
FIG. 10 is a diagram illustrating a resonator having a three-dimensional (3D) structure.

FIG. 10 illustrates a resonator 1000 having a three-dimensional (3D) structure.

Referring to FIG. 10, the resonator 1000 having the 3D structure may include a transmission line and a capacitor 1020. The transmission line may include a first signal conducting portion 1011, a second signal conducting portion 1012, and a ground conducting portion 1013. The capacitor 1020 may be inserted, for instance, in series between the first signal conducting portion 1011 and the second signal conducting portion 1012 of the transmission link, such that an electric field may be confined within the capacitor 1020.

As shown in FIG. 10, the resonator 1000 may have a generally 3D structure. The transmission line may include the first signal conducting portion 1011 and the second signal conducting portion 1012 in an upper portion of the resonator 1000, and may include the ground conducting portion 1013 in a lower portion of the resonator 1000. The first signal conducting portion 1011 and the second signal conducting portion 1012 may be disposed to face the ground conducting portion 1013. In this arrangement, a current may flow in an x direction through the first signal conducting portion 1011 and the second signal conducting portion 1012. Due to the current, a magnetic field H(W) may be formed in a −y direction. However, it will be appreciated that the magnetic field H(W) might also be formed in the opposite direction (e.g., the +y direction), in other implementations.

In one or more embodiments, one end of the first signal conducting portion 1011 may be electrically connected (i.e., shorted) to a conductor 1042, and another end of the first signal conducting portion 1011 may be connected to the capacitor 1020. One end of the second signal conducting portion 1012 may be grounded to a conductor 1041, and another end of the second signal conducting portion 1012 may be connected to the capacitor 1020. Accordingly, the first signal conducting portion 1011, the second signal conducting portion 1012, the ground conducting portion 1013, and the conductors 1041 and 1042 may be connected to each other, whereby the resonator 1000 may have an electrically "closed-loop" structure.

As shown in FIG. 10, the capacitor 1020 may be inserted or otherwise positioned between the first signal conducting portion 1011 and the second signal conducting portion 1012. For example, the capacitor 1020 may be inserted into a space between the first signal conducting portion 1011 and the second signal conducting portion 1012. The capacitor 1020 may include, for example, a lumped element, a distributed element, or the like. In one implementation, a distributed capacitor having the shape of the distributed element may include zigzagged conductor lines and a dielectric material having a relatively high permittivity positioned between the zigzagged conductor lines.

When the capacitor 1020 is inserted into the transmission line, the resonator 1000 may have a property of a metamaterial, in some instances, as discussed above. For example, when a capacitance of the capacitor inserted is a lumped element the resonator 1000 may have the characteristic of the metamaterial. When the resonator 1000 has a negative magnetic permeability by appropriately adjusting the capacitance of the capacitor 1020, the resonator 1000 may also be referred to as an MNG resonator. Various criteria may be applied to determine the capacitance of the capacitor 1020. For example, the various criteria may include, for instance, one or more of the following: a criterion for enabling the resonator 1000 to have the characteristic of the metamaterial, a criterion for enabling the resonator 1000 to have a negative magnetic permeability in a target frequency, a criterion enabling the resonator 1000 to have a zeroth order resonance characteristic in the target frequency, or the like. Based on at least one criterion among the aforementioned criteria, the capacitance of the capacitor 1020 may be determined.

The resonator 1000, also referred to as the MNG resonator 1000, may have a zeroth order resonance characteristic (i.e., having, as a resonance frequency, a frequency when a propagation constant is "0"). If the resonator 1000 has the zeroth order resonance characteristic, the resonance frequency may be independent with respect to a physical size of the MNG resonator 1000. Thus, by appropriately designing the capacitor 1020, the MNG resonator 1000 may sufficiently change the resonance frequency without substantially changing the physical size of the MNG resonator 1000.

Referring to the MNG resonator 1000 of FIG. 10, in a near field, the electric field may be concentrated on the capacitor 1020 inserted into the transmission line. Accordingly, due to the capacitor 1020, the magnetic field may become dominant in the near field. And, since the MNG resonator 1000 having the zeroth-order resonance characteristic may have characteristics similar to a magnetic dipole, the magnetic field may become dominant in the near field. A relatively small amount of the electric field formed due to the insertion of the capacitor 1020 may be concentrated on the capacitor 1020 and thus, the magnetic field may become further dominant.

Also, the MNG resonator 1000 may include a matcher 1030 for impedance matching. The matcher 1030 may be configured to appropriately adjust the strength of magnetic field of the MNG resonator 1000. The impedance of the MNG resonator 1000 may be determined by the matcher 1030. In one or more implementations, a current may flow in the MNG resonator 1000 via a connector 1040, or may flow out from the MNG resonator 1000 via the connector 1040. And the connector 1040 may be connected to the ground conducting portion 1013 or the matcher 1030.

As shown in FIG. 10, the matcher 1030 may be positioned within the loop formed by the loop structure of the resonator 1000. The matcher 1030 may be configured to adjust the impedance of the resonator 1000 by changing the physical shape of the matcher 1030. For example, the matcher 1030 may include a conductor 1031 for the impedance matching in a location separate from the ground conducting portion 1013 by a distance h. The impedance of the resonator 1000 may be changed by adjusting the distance h.

In some implementations, a controller may be provided to control the matcher 1030. In this case, the matcher 1030 may change the physical shape of the matcher 1030 based on a control signal generated by the controller. For example, the distance h between the conductor 1031 of the matcher 1030 and the ground conducting portion 1013 may be increased or decreased based on the control signal. Accordingly, the physical shape of the matcher 1030 may be changed such that the impedance of the resonator 1000 may be adjusted. The distance h between the conductor 1031 of the matcher 1030 and the ground conducting portion 1013 may be adjusted using a variety of schemes. For example, a plurality of conductors may be included in the matcher 1030 and the distance h may be adjusted by adaptively activating one of the conductors. Alternatively or additionally, the distance h may be adjusted by adjusting the physical location of the conductor 1031 up and down. For instance, the distance h may be controlled based on the control signal of the controller. The controller may generate the control signal using various factors. As shown in FIG. 10, the matcher 1030 may be configured as a passive element such as, for instance, the conductor 1031. Of course, in other embodiments, the matcher 1030 may be configured as an active element such as, for example, a diode, a transistor, or the like. When the active element is included in the matcher 1030, the active element may be driven based on the control signal generated by the controller, and the impedance of the resonator 1000 may be adjusted based on the control signal. For example, if the active element is a diode included in the matcher 1030, the impedance of the resonator 1000 may be adjusted depending on whether the diode is in an on state or in an off state.

In some implementations, a magnetic core may be further provided to pass through the resonator 1000 configured as the MNG resonator. The magnetic core may perform a function of increasing a power transmission distance.

Figure 11:
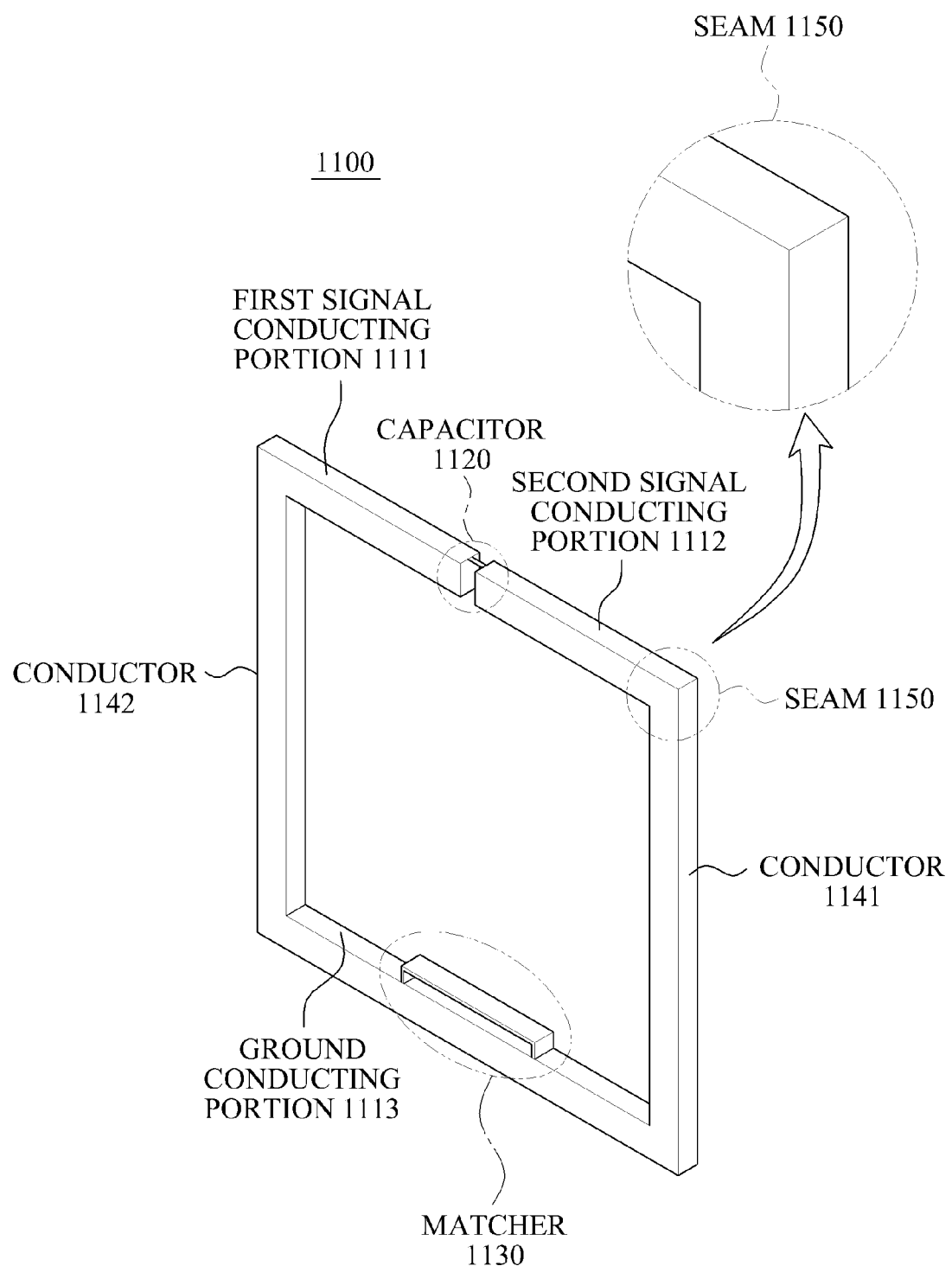
FIG. 11 is a diagram illustrating a resonator for wireless power transmission configured as a bulky type.

FIG. 11 illustrates a resonator 1100 for a wireless power transmission configured as a bulky type.

As used herein, the term "bulky type" may refer to a seamless connection connecting at least two parts in an integrated form.

Referring to FIG. 11, a first signal conducting portion 1111 and a second signal conducting portion 1112 may be integrally formed instead of being separately manufactured and thereby be connected to each other. Similarly, the second signal conducting portion 1112 and a conductor 1141 may also be integrally manufactured.

Figure 12:
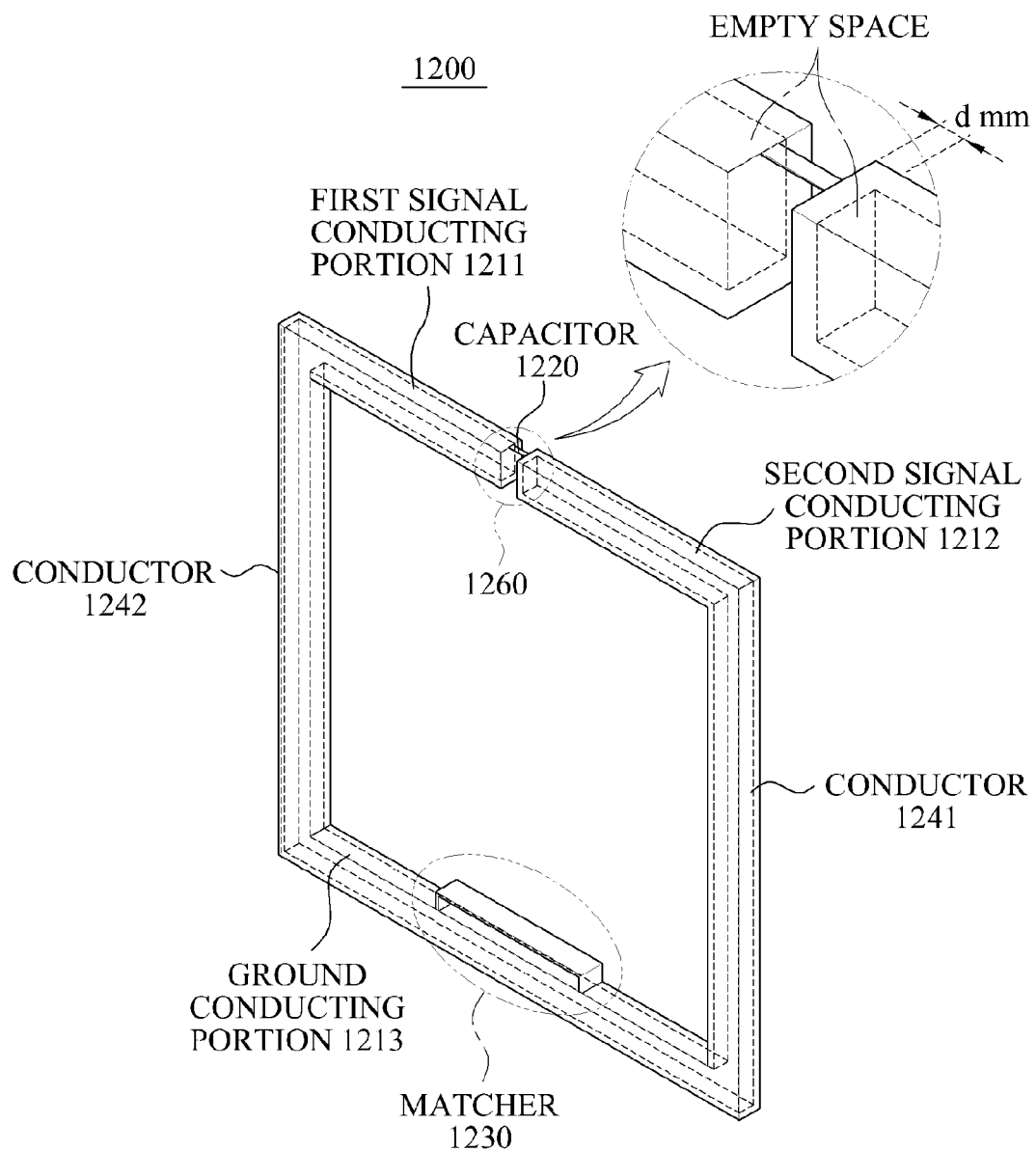
FIG. 12 is a diagram illustrating a resonator for wireless power transmission configured as a hollow type.

When the second signal conducting portion 1112 and the conductor 1141 are separately manufactured and then connected to each other, a loss of conduction may occur due to a seam 1150. Thus, in some implementations, the second signal conducting portion 1112 and the conductor 1141 may be connected to each other without using a separate seam (i.e., seamlessly connected to each other). Accordingly, it is possible to decrease a conductor loss caused by the seam 1150. For instance, the second signal conducting portion 1112 and a ground conducting portion 1113 may be seamlessly and integrally manufactured. Similarly, the first signal conducting portion 1111, the conductor 1142 and the ground conducting portion 1113 may be seamlessly and integrally manufactured. A matcher 1130 may be provided that is similarly constructed as described herein in one or more embodiments. FIG. 12 illustrates a resonator 1200 for a wireless power transmission, configured as a hollow type.

Referring to FIG. 12, each of a first signal conducting portion 1211, a second signal conducting portion 1212, a ground conducting portion 1213, and conductors 1241 and 1242 of the resonator 1200 configured as a hollow type structure. As used herein, the term "hollow type" refers to a configuration that may include an empty space inside.

For a given resonance frequency, an active current may be modeled to flow in only a portion of the first signal conducting portion 1211 instead of all of the first signal conducting portion 1211, the second signal conducting portion 1212 instead of all of the second signal conducting portion 1212, the ground conducting portion 1213 instead of all of the ground conducting portion 1213, and the conductors 1241 and 1242 instead of all of the conductors 1241 and 1242. When a depth of each of the first signal conducting portion 1211, the second signal conducting portion 1212, the ground conducting portion 1213, and the conductors 1241 and 1242 is significantly deeper than a corresponding skin depth in the given resonance frequency, it may be ineffective. The significantly deeper depth may, however, increase a weight or manufacturing costs of the resonator 1200 in some instances.

Accordingly, for the given resonance frequency, the depth of each of the first signal conducting portion 1211, the second signal conducting portion 1212, the ground conducting portion 1213, and the conductors 1241 and 1242 may be appropriately determined based on the corresponding skin depth of each of the first signal conducting portion 1211, the second signal conducting portion 1212, the ground conducting portion 1213, and the conductors 1241 and 1242. When each of the first signal conducting portion 1211, the second signal conducting portion 1212, the ground conducting portion 1213, and the conductors 1241 and 1242 has an appropriate depth deeper than a corresponding skin depth, the resonator 1200 may become light, and manufacturing costs of the resonator 1200 may also decrease.

For example, as shown in FIG. 12, the depth of the second signal conducting portion 1212 (as further illustrated in the enlarged view region 1260 indicated by a circle) may be determined as "d" mm and d may be determined according to $$d = \frac{1}{\sqrt{\pi f \mu \sigma}}.$$

Here, f denotes a frequency, µ denotes a magnetic permeability, and σ denotes a conductor constant. In one implementation, when the first signal conducting portion 1211, the second signal conducting portion 1212, the ground conducting portion 1213, and the conductors 1241 and 1242 are made of a copper and they may have a conductivity of $5.8 \times 10^7$ siemens per meter (S·m$^{-1}$), the skin depth may be about 0.6 mm with respect to 10 kHz of the resonance frequency and the skin depth may be about 0.006 mm with respect to 100 MHz of the resonance frequency.

A capacitor 1220 and a matcher 1230 may be provided that are similarly constructed as described herein in one or more embodiments.

Figure 13:
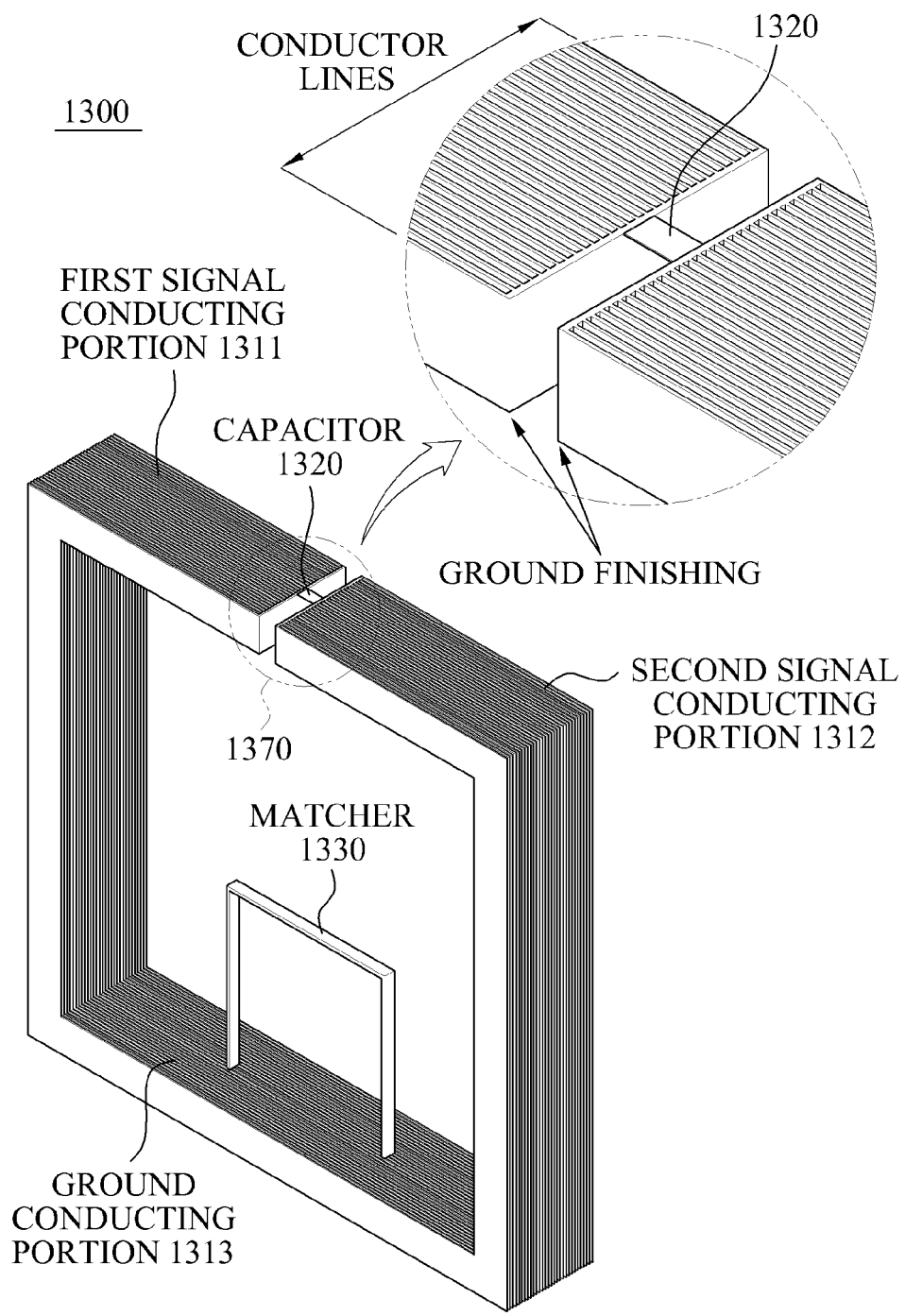
FIG. 13 is a diagram illustrating a resonator for wireless power transmission using a parallel-sheet.

FIG. 13 illustrates a resonator 1300 for a wireless power transmission using a parallel-sheet.

Referring to FIG. 13, the parallel-sheet may be applicable to each of a first signal conducting portion 1311 and a second signal conducting portion 1312 included in the resonator 1300.

Each of the first signal conducting portion 1311 and the second signal conducting portion 1312 may not be a perfect conductor and thus, may an inherent resistance. Due to this resistance, an ohmic loss may occur. The ohmic loss may decrease a Q-factor and also decrease a coupling effect.

By applying the parallel-sheet to each of the first signal conducting portion 1311 and the second signal conducting portion 1312, it may be possible to decrease the ohmic loss, and to increase the Q-factor and the coupling effect. Referring to the enlarged view portion 1370 indicated by a circle, when the parallel-sheet is applied, each of the first signal conducting portion 1311 and the second signal conducting portion 1312 may include a plurality of conductor lines. The plurality of conductor lines may be disposed in parallel, and may be electrically connected (i.e., shorted) at an end portion of each of the first signal conducting portion 1311 and the second signal conducting portion 1312.

When the parallel-sheet is applied to each of the first signal conducting portion 1311 and the second signal conducting portion 1312, the plurality of conductor lines may be disposed in parallel. Accordingly, a sum of resistances having the conductor lines may decrease. Consequently, the resistance loss may decrease, and the Q-factor and the coupling effect may increase.

A capacitor 1320 and a matcher 1330 positioned on the ground conducting portion 1313 may be provided that are similarly constructed as described herein in one or more embodiments.

Figure 14:
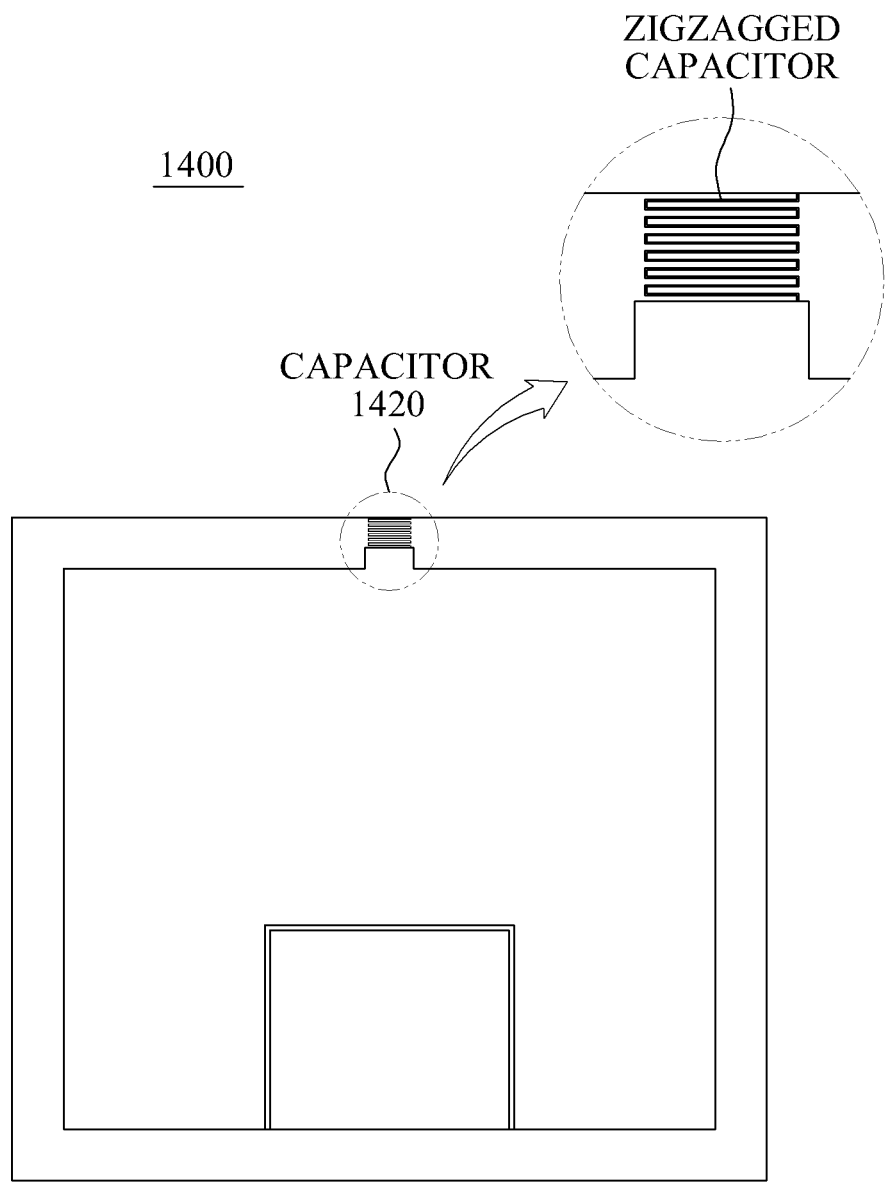
FIG. 14 is a diagram illustrating a resonator for wireless power transmission, the resonator including a distributed capacitor.

FIG. 14 illustrates a resonator 1400 for a wireless power transmission, including a distributed capacitor.

Referring to FIG. 14, a capacitor 1420 included in the resonator 1400 is configured for the wireless power transmission. A capacitor used as a lumped element may have a relatively high equivalent series resistance (ESR). A variety of schemes have been proposed to decrease the ESR contained in the capacitor of the lumped element. According to an embodiment, by using the capacitor 1420 as a distributed element, it may be possible to decrease the ESR. As will be appreciated, a loss caused by the ESR may decrease a Q-factor and a coupling effect.

As shown in FIG. 14, the capacitor 1420 may be configured as a conductive line having a zigzagged structure.

By employing the capacitor 1420 as the distributed element, it may be possible to decrease the loss occurring due to the ESR in some instances. In addition, by disposing a plurality of capacitors as lumped elements, it may be possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR, in some instances.

Figure 15A:
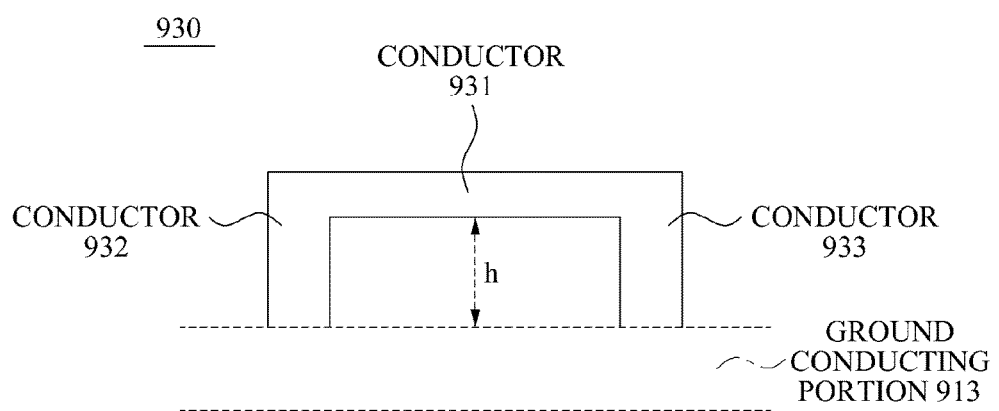
FIG. 15A is a diagram illustrating a matcher used by a 2D resonator.
Figure 15B:
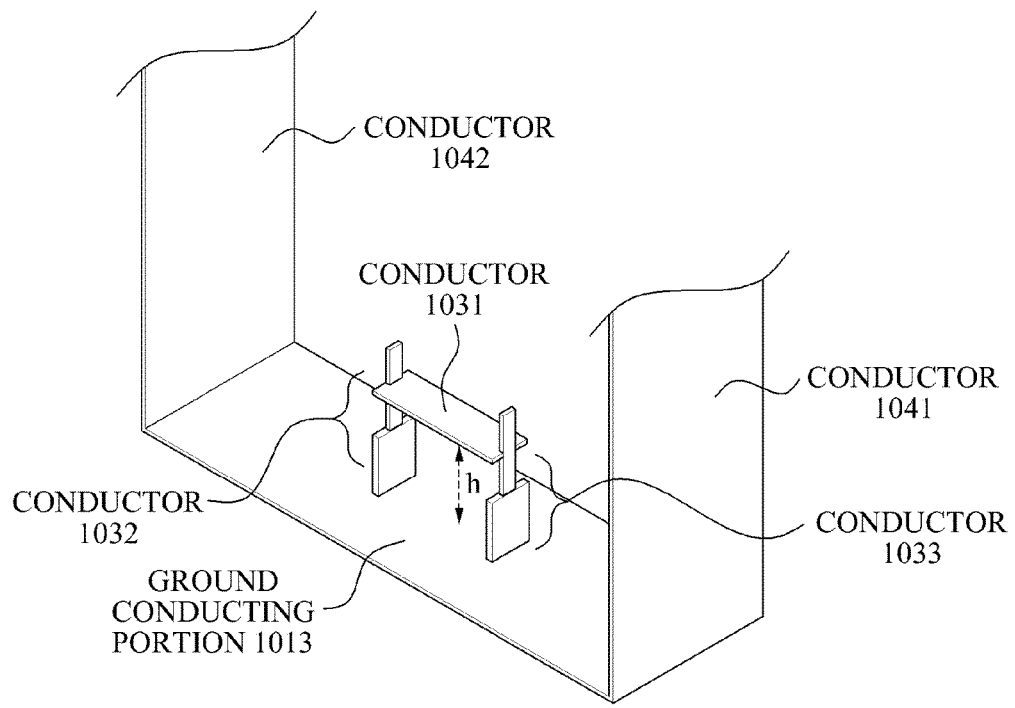
FIG. 15B is a diagram illustrating a matcher used by a 3D resonator.

FIG. 15A illustrates the matcher 930 used in the resonator 900 provided in the 2D structure of FIG. 9, and FIG. 15B illustrates an example of the matcher 1030 used in the resonator 1000 provided in the 3D structure of FIG. 10.

FIG. 15A illustrates a portion of the 2D resonator including the matcher 930, and FIG. 15B illustrates a portion of the 3D resonator of FIG. 10 including the matcher 1030.

Referring to FIG. 15A, the matcher 930 may include the conductor 931, a conductor 932, and a conductor 933. The conductors 932 and 933 may be connected to the ground conducting portion 913 and the conductor 931. The impedance of the 2D resonator may be determined based on a distance h between the conductor 931 and the ground conducting portion 913. The distance h between the conductor 931 and the ground conducting portion 913 may be controlled by the controller. The distance h between the conductor 931 and the ground conducting portion 913 can be adjusted using a variety of schemes. For example, the variety of schemes may include, for instance, one or more of the following: a scheme of adjusting the distance h by adaptively activating one of the conductors 931, 932, and 933, a scheme of adjusting the physical location of the conductor 931 up and down, or the like.

Referring to FIG. 15B, the matcher 1030 may include the conductor 1031, a conductor 1032, a conductor 1033 and conductors 1041 and 1042. The conductors 1032 and 1033 may be connected to the ground conducting portion 1013 and the conductor 1031. Also, the conductors 1041 and 1042 may be connected to the ground conducting portion 1013. The impedance of the 3D resonator may be determined based on a distance h between the conductor 1031 and the ground conducting portion 1013. The distance h between the conductor 1031 and the ground conducting portion 1013 may be controlled by the controller, for example. Similar to the matcher 930 included in the 2D structured resonator, in the matcher 1030 included in the 3D structured resonator, the distance h between the conductor 1031 and the ground conducting portion 1013 may be adjusted using a variety of schemes. For example, the variety of schemes may include, for instance, one or more of the following: a scheme of adjusting the distance h by adaptively activating one of the conductors 1031, 1032, and 1033, a scheme of adjusting the physical location of the conductor 1031 up and down, or the like.

In some implementations, the matcher may include an active element. Thus, a scheme of adjusting an impedance of a resonator using the active element may be similar as described above. For example, the impedance of the resonator may be adjusted by changing a path of a current flowing through the matcher using the active element.

Figure 16:
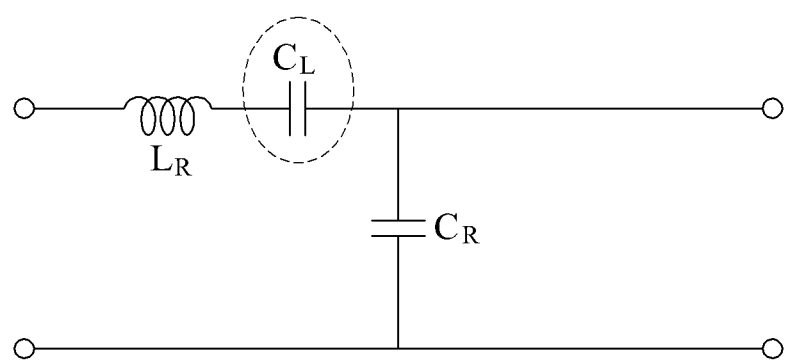
FIG. 16 is a diagram illustrating an equivalent circuit of the resonator for wireless power transmission illustrated in FIG. 9.

FIG. 16 illustrates an equivalent circuit of the resonator 900 for the wireless power transmission of FIG. 9.

The resonator 900 of FIG. 9 for the wireless power transmission may be modeled to the equivalent circuit of FIG. 16. In the equivalent circuit depicted in FIG. 16, $L_R$ denotes an inductance of the power transmission line, $C_L$ denotes the capacitor 920 that is inserted in a form of a lumped element in the middle of the power transmission line, and $C_R$ denotes a capacitance between the power transmissions and/or ground of FIG. 9.

In some instances, the resonator 900 may have a zeroth resonance characteristic. For example, when a propagation constant is "0", the resonator 900 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \quad \text{[Equation 2]}$$

In Equation 2, MZR denotes a Mu zero resonator. Referring to Equation 2, the resonance frequency $\omega_{MZR}$ of the resonator 900 may be determined by $L_R/C_L$. A physical size of the resonator 900 and the resonance frequency $\omega_{MZR}$ may be independent with respect to each other. Since the physical sizes are independent with respect to each other, the physical size of the resonator 900 may be sufficiently reduced.

Figure 17:
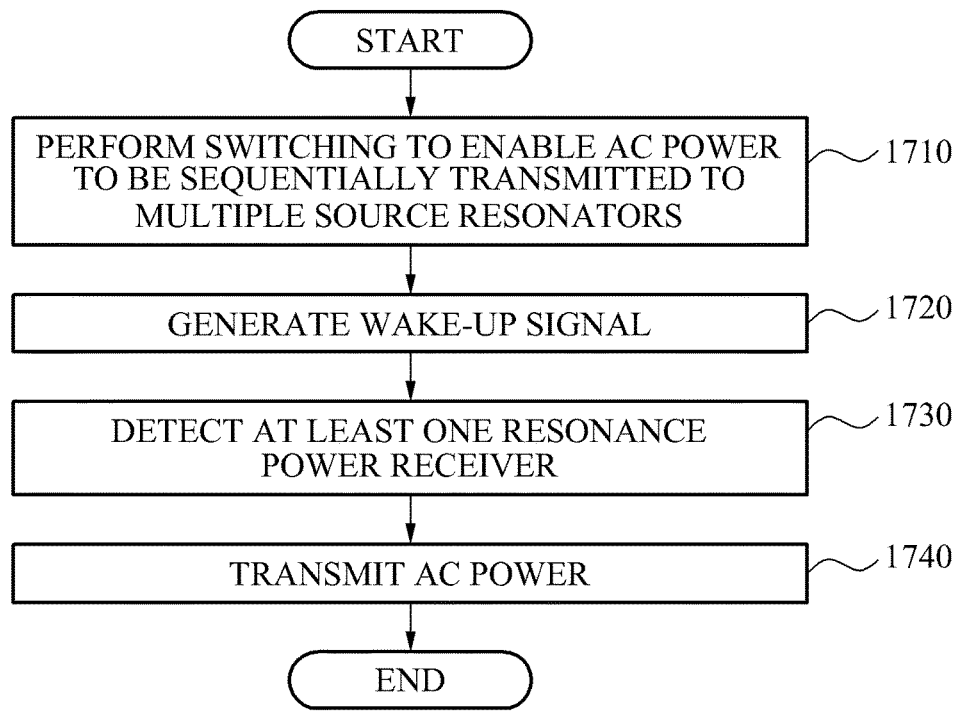
FIG. 17 is a flowchart illustrating a resonance power transmission method.

FIG. 17 illustrates a resonance power transmission method.

In operation 1710, a resonance power transmitter may switch paths through which AC power supplied from a power supply is transmitted, in order to enable the AC power to be sequentially transmitted to multiple source resonators.

In operation 1720, the resonance power transmitter may generate, using the AC power, a wake-up signal that is configured to wake up at least one resonance power receiver.

In operation 1730, the resonance power transmitter may detect the at least one resonance power receiver is awaken, based on a response signal with respect to the wake-up signal.

In operation 1740, the resonance power transmitter may transmit the AC power to the at least one detected resonance power receiver.

In one or more embodiments, the resonance power transmitter may control at least one source resonator corresponding to the at least one resonance power receiver, based on a signal that is received from the at least one resonance power receiver during a predetermined time.

Figure 18:
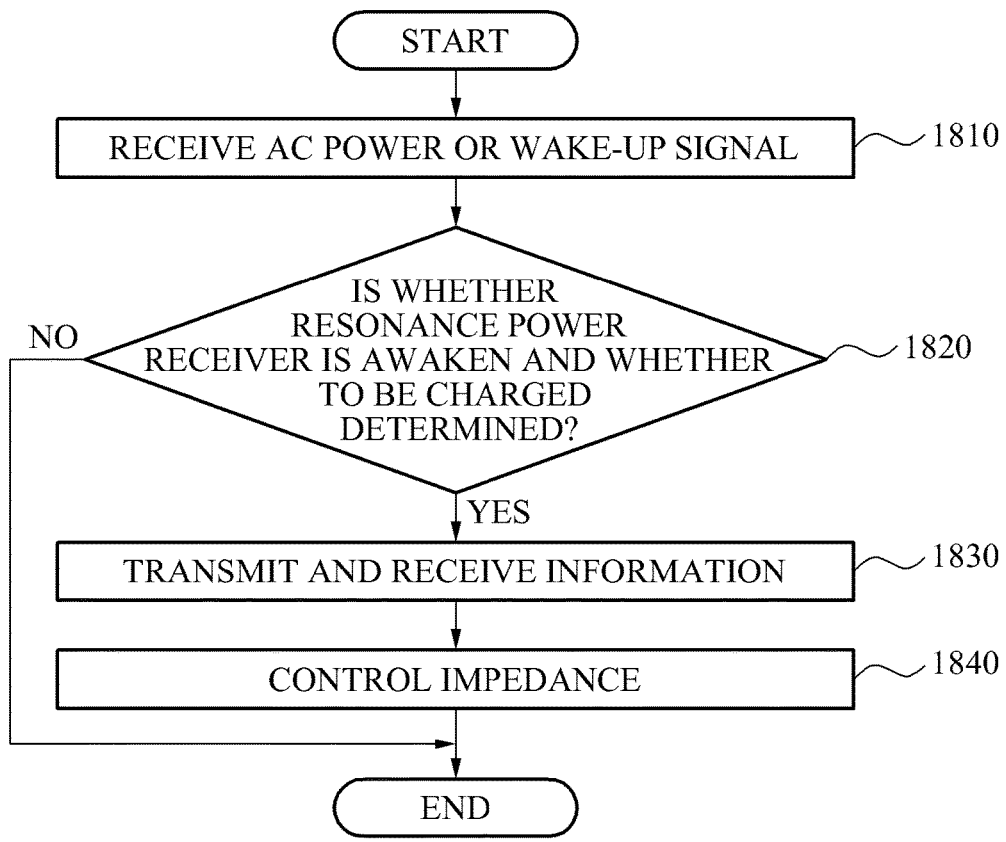
FIG. 18 is a flowchart illustrating a resonance power reception method.

FIG. 18 illustrates a resonance power reception method.

In operation 1810, a resonance power receiver may receive an AC power or a wake-up signal from a resonance power transmitter, via a magnetic coupling. In some implementations, the resonance power receiver may receive, from the resonance power transmitter, the AC power via the magnetic coupling, during a predetermined time period (e.g., regular intervals).

In operation 1820, the resonance power receiver may determine whether a target resonator and the resonance power receiver are awakened by the wake-up signal and whether the resonance power receiver is to be charged.

If the result of operation 1820 is YES, then in operation 1830, the resonance power receiver may receive an ID of the resonance power transmitter and an ID of a source resonator included in the resonance power transmitter, and transmit a response signal with respect to the wake-up signal, a charging request signal, information associated with an ID of an awakened target resonator, and information associated with an ID of an awakened resonance power receiver. Otherwise, if the result of operation 1820 is NO, then the method ends.

In operation 1840, the resonance power receiver may perform impedance matching between the source resonator and the awakened target resonator for subsequent power transmission.

In various embodiments, one or more of the processes, functions, methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory; and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

It is understood that the terminology used herein, may be different in other applications or when described by another person of ordinary skill in the art.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A resonance power transmitter comprising:
   a source resonance unit comprising a first source resonator transmitting a first power to a first resonance power receiver during a first time period and a second source resonator transmitting a second power to a second resonance power receiver during a second time period;
   a path-multiplexer to supply a source power to the first source resonator during the first time period and supply the source power to the second source resonator during the second time period;
   a detector to transmit a wake-up signal to at least two resonance power receivers, and detect the first resonance power receiver and the second resonance power receiver; and
   a source controller to adjust a level of the first power based on a length of the first time period, and adjust a level of the second power based on a length of the second time period, so that the first power and the second power are transmitted to the first resonance power receiver and the second resonance power receiver in a non-overlapping alternating manner that produces a total power at an average power level.

2. The resonance power transmitter of claim 1, wherein the source controller controls a switching signal in order to sequentially transmit the wake-up signal from each of the first source resonator and second source resonator to the at least two resonance power receivers during a time period, and controls the first source resonator and second source resonator based on signals received from the at least two resonance power receivers during the time period.

3. The resonance power transmitter of claim 1, wherein, when the at least two resonance power receivers are detected, the source controller controls an impedance of either one or both of the first source resonator and the second source resonator corresponding to the at least two detected resonance power receivers in order to perform impedance matching between the either one or both of the first source resonator and the second source resonator and the at least two detected resonance power receivers.

4. The resonance power transmitter of claim 1, wherein, when the at least two resonance power receivers are detected, the source controller controls a switching signal to select either one or both of the first source resonator and the second source resonator corresponding to the at least two detected resonance power receivers in order to transmit the corresponding power to the at least two detected resonance power receivers.

5. The resonance power transmitter of claim 4, wherein the either one or both of the first source resonator and the second source resonator corresponding to the at least two detected resonance power receivers transmits the corresponding power to the at least two detected resonance power receivers during a time period.

6. The resonance power transmitter of claim 1, further comprising:
   a communication unit to receive, from the at least two detected resonance power receivers, a signal received in response to the wake-up signal, information associated with an identification (ID) of at least one resonator included in the at least two resonance power receivers, and information associated with an ID of the at least two resonance power receivers.

7. The resonance power transmitter of claim 6, wherein the communication unit obtains, from the at least two detected resonance power receivers, information for impedance matching between either one or both of the first source resonator and the second source resonator corresponding to the at least two detected resonance power receivers and the at least two detected resonance power receivers.

8. The resonance power transmitter of claim 1, wherein the source resonance unit comprises an array of multiple source resonators, with each of the multiple source resonators being configured to transmit a resonance power to a area of a target resonator of the at least two detected resonance power receivers.

9. A resonance power transmitter comprising:
   a source resonator comprising a first source resonator transmitting a first power to a first resonance power receiver during a first time period and a second source resonator transmitting a second power to a second resonance power receiver during a second time period;
   a controller to transmit a wake-up signal to at least two resonance power receivers; and
   a detector to detect the first resonance power receiver and the second resonance power receiver based on a signal in response to the wake-up,
   wherein a source power is supplied to the first source resonator during the first time period, and the source power is supplied to the second source resonator during the second time period, and
   wherein the controller adjusts a level of the first power based on a length of the first time period, and adjusts a level of the second power based on a length of the second time period, so that the first power and the second power are transmitted to the first resonance power receiver and the second resonance power receiver in a non-overlapping alternating manner that produces a total power at an average power level.

* * * * *